United States Patent [19]

Aramaki

[11] Patent Number: 5,717,671

[45] Date of Patent: Feb. 10, 1998

[54] APPARATUS AND METHOD FOR RECORDING CONSTANT INTERVAL OF SILENCE

[75] Inventor: Junichi Aramaki, Chiba, Japan

[73] Assignee: Sony Corporation, Tokyo, Japan

[21] Appl. No.: 563,638

[22] Filed: Nov. 28, 1995

[30] Foreign Application Priority Data

Nov. 30, 1994 [JP] Japan .................................. 6-319495

[51] Int. Cl.[6] .................................................. G11B 5/09
[52] U.S. Cl. .............................. 369/48; 369/54; 369/32
[58] Field of Search ................................ 369/32, 47, 48, 369/49, 50, 54, 58, 60

[56] References Cited

U.S. PATENT DOCUMENTS

| | | | |
|---|---|---|---|
| 4,782,402 | 11/1988 | Faerber et al. | 358/335 |
| 4,841,503 | 6/1989 | Yamada | 369/14 |
| 4,932,016 | 6/1990 | Yoshida et al. | 369/48 |
| 5,065,388 | 11/1991 | Roth et al. | 369/47 |
| 5,124,963 | 6/1992 | Ando | 369/32 |
| 5,140,567 | 8/1992 | Kawabata et al. | 369/13 |
| 5,146,369 | 9/1992 | Yamaguchi | 360/15 |
| 5,179,543 | 1/1993 | Nara et al. | 369/3 |
| 5,257,111 | 10/1993 | Kakuyama | 358/342 |
| 5,295,126 | 3/1994 | Okano | 369/47 |
| 5,301,181 | 4/1994 | Shiba | 369/84 |
| 5,311,492 | 5/1994 | Tabuchi | 369/47 |
| 5,319,628 | 6/1994 | Stas et al. | 369/54 |
| 5,325,352 | 6/1994 | Matsumoto | 369/275.1 |
| 5,331,617 | 7/1994 | Fuma | 369/54 |
| 5,337,199 | 8/1994 | Arai | 360/8 |
| 5,343,452 | 8/1994 | Maeda | 369/32 |
| 5,345,433 | 9/1994 | Ohga | 369/54 |
| 5,363,362 | 11/1994 | Maeda | 369/54 |
| 5,377,167 | 12/1994 | Maeda | 369/47 |
| 5,414,688 | 5/1995 | Inokuchi | 369/84 |
| 5,420,838 | 5/1995 | Maeda | 369/32 |
| 5,420,843 | 5/1995 | Yoshida | 369/58 |
| 5,432,768 | 7/1995 | Terashima | 369/58 |
| 5,442,608 | 8/1995 | Umeda | 369/44.27 |
| 5,452,281 | 9/1995 | Otoguro | 369/85 |
| 5,457,667 | 10/1995 | Kojima | 369/32 |
| 5,473,590 | 12/1995 | Yokota et al. | 369/58 X |
| 5,485,443 | 1/1996 | Niwayama | 369/54 |
| 5,487,047 | 1/1996 | Oka | 369/32 |

FOREIGN PATENT DOCUMENTS

| | | | |
|---|---|---|---|
| 0 097 768 A2 | 1/1984 | European Pat. Off. | G11B 5/58 |
| 0 257 594 A2 | 3/1988 | European Pat. Off. | G11B 7/013 |
| 0288571 A1 | 11/1988 | European Pat. Off. | G11B 27/00 |
| 0308148 A3 | 3/1989 | European Pat. Off. | G11B 20/10 |
| 0 364 224 A1 | 4/1990 | European Pat. Off. | G11B 7/095 |
| 0419012 A2 | 3/1991 | European Pat. Off. | G11B 7/28 |
| 0480682 A2 | 4/1992 | European Pat. Off. | G11B 27/30 |
| 0506471 A1 | 9/1992 | European Pat. Off. | G11B 7/007 |
| 0511633 A2 | 11/1992 | European Pat. Off. | G11B 27/031 |
| 0612067 A2 | 8/1994 | European Pat. Off. | G11B 7/28 |
| 4216593 A1 | 12/1992 | Germany | G11B 7/00 |
| 2-123588 | 5/1990 | Japan | G11B 27/10 |
| 4-114384 | 4/1992 | Japan | G11B 27/034 |
| 4-258834 | 9/1992 | Japan | G11B 11/10 |
| WO 90/12395 | 10/1990 | WIPO | G11B 7/28 |

OTHER PUBLICATIONS

Database WPIL, No. 81 B0881D, Derwent Publications Ltd. London; & SU-A-737 879 (Suskov V. M.).

*Primary Examiner*—P. W. Huber
*Attorney, Agent, or Firm*—Limbach & Limbach L.L.P.

[57] ABSTRACT

A recording apparatus for making soundless information on a recording medium uniform in length by detecting a soundless portion of an input signal and overwriting the soundless portion detected to continue for a period longer than a predetermined time on a soundless portion already recorded on the recording medium till the audio data enters a sounding state.

13 Claims, 16 Drawing Sheets

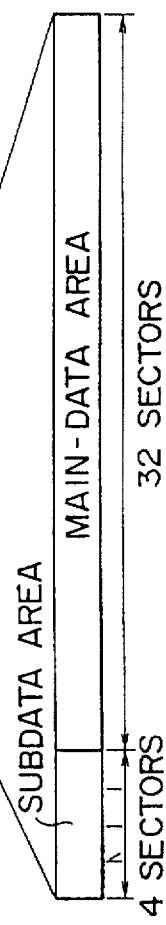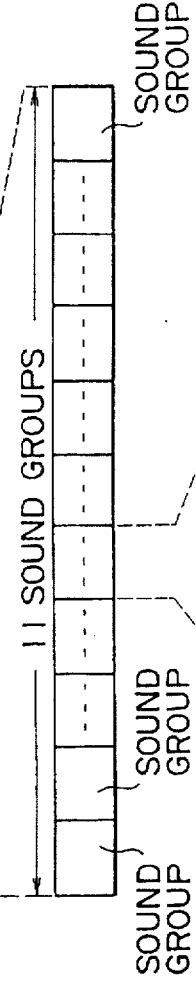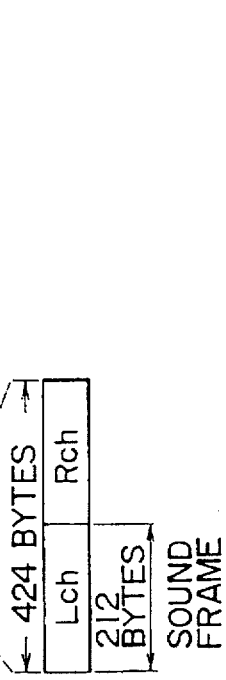
F I G. 2A
F I G. 2B
F I G. 2C
F I G. 2D
F I G. 2E

FIG. 3  U-TOC'S SECTOR 0

| | 16 bit | | 16 bit | | |
|---|---|---|---|---|---|
| | MSB      LSB | MSB      LSB | MSB      LSB | MSB      LSB | |
| SYNCHRONIZATION CODES | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| HEADER | Cluster H | Cluster L | 00000000 | 00000010 | 3 |
| | 00000000 | 00000000 | 00000000 | 00000000 | 4 |
| | 00000000 | 00000000 | 00000000 | 00000000 | 5 |
| | 00000000 | 00000000 | 00000000 | 00000000 | 6 |
| | Maker Code | Model Code | First TNO | Last TNO | 7 |
| | 00000000 | 00000000 | 00000000 | Used Sectors | 8 |
| | 00000000 | 00000000 | 00000000 | 00000000 | 9 |
| DATA SEGMENT (POINTING DATA / ASSOCIATED TABLES) | 00000000 | 00000000 | 00000000 | Disc Serial No | 10 |
| | Disc | ID | P-DFA | P-EMPTY | 11 |
| | P-FRA | P-TNO1 | P-TNO2 | P-TNO3 | 12 |
| | P-TNO4 | P-TNO5 | P-TNO6 | P-TNO7 | 13 |
| | P-TNO248 | P-TNO249 | P-TNO250 | P-TNO251 | 74 |
| | P-TNO252 | P-TNO253 | P-TNO254 | P-TNO255 | 75 |
| | 00000000 | 00000000 | 00000000 | 00000000 | 76 |
| | 00000000 | 00000000 | 00000000 | 00000000 | 77 |
| CONTROL-TABLE SEGMENT (255 PART TABLES) | (01h) START ADDRESS | | | TRACK MODE | 78 |
| | END ADDRESS | | | LINK INFORMATION | 79 |
| | (02h) START ADDRESS | | | TRACK MODE | 80 |
| | END ADDRESS | | | LINK INFORMATION | 81 |
| | (03h) START ADDRESS | | | TRACK MODE | 82 |
| | END ADDRESS | | | LINK INFORMATION | 83 |
| | (FCh) START ADDRESS | | | TRACK MODE | 580 |
| | END ADDRESS | | | LINK INFORMATION | 581 |
| | (FDh) START ADDRESS | | | TRACK MODE | 582 |
| | END ADDRESS | | | LINK INFORMATION | 583 |
| | (FEh) START ADDRESS | | | TRACK MODE | 584 |
| | END ADDRESS | | | LINK INFORMATION | 585 |
| | (FFh) START ADDRESS | | | TRACK MODE | 586 |
| | END ADDRESS | | | LINK INFORMATION | 587 |

FRAME STRUCTURE

| FRAME | SUBCODING |
|---|---|
| 98n+1 | SYNCHRONIZATION PATTERN |
| 98n+2 | SYNCHRONIZATION PATTERN |
| 98n+3 | $P_1$ $Q_1$ $R_1$ $S_1$ $T_1$ $U_1$ $V_1$ $W_1$ |
| 98n+4 | $P_2$ $Q_2$ $R_2$ $S_2$ $T_2$ $U_2$ $V_2$ $W_2$ |
| ⋮ | ⋮ |
| 98n+97 | $P_{95}$ $Q_{95}$ $R_{95}$ $S_{95}$ $T_{95}$ $U_{95}$ $V_{95}$ $W_{95}$ |
| 98n+98 | $P_{96}$ $Q_{96}$ $R_{96}$ $S_{96}$ $T_{96}$ $U_{96}$ $V_{96}$ $W_{96}$ |
| 98(n+1)+1 | |

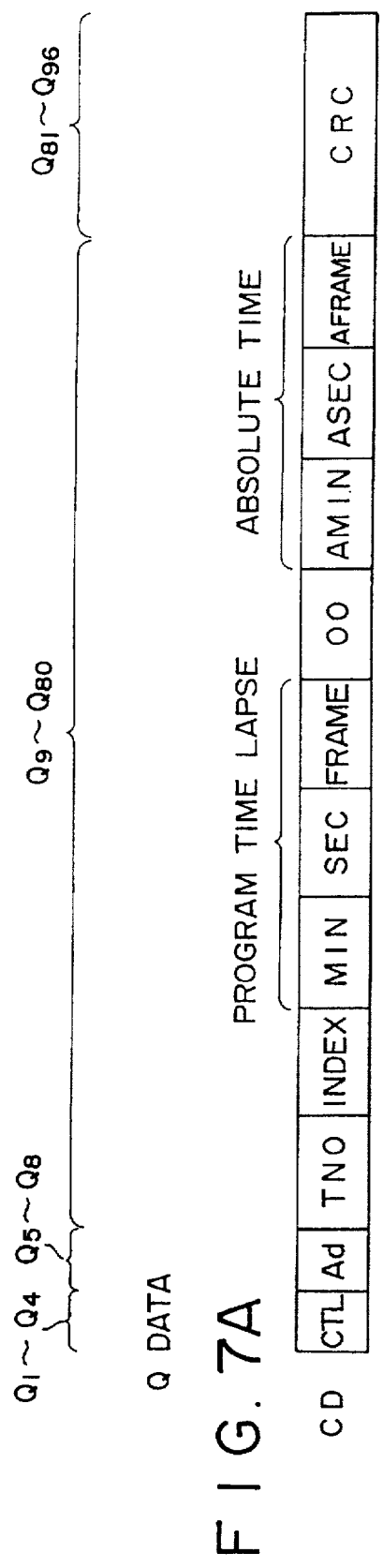
FIG. 7A
FIG. 7B

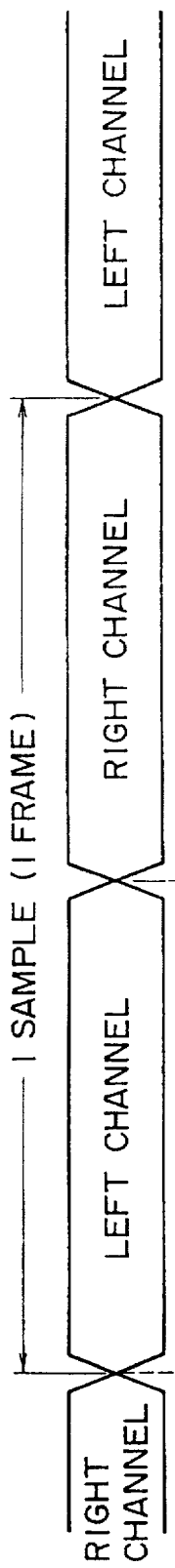
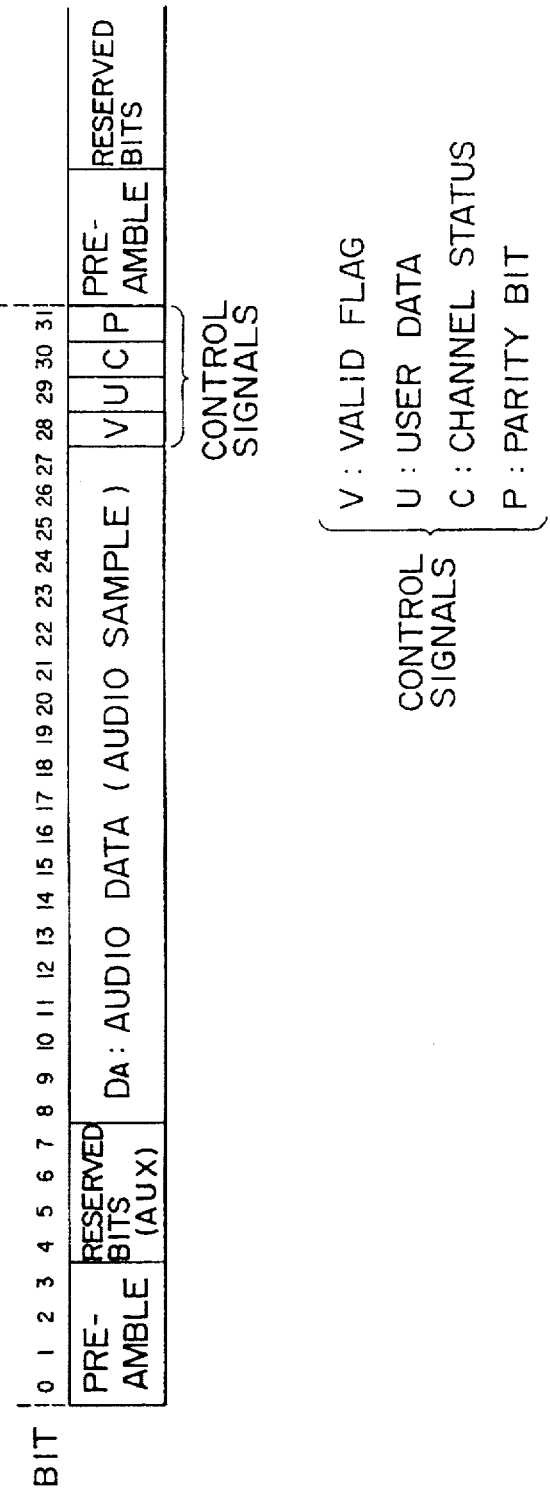

FIG. 9

SUBCODES CREATED FROM U BITS

| SUBCODE SYNCHRONIZATION WORD | | | | | | | | | | | | | |
|---|---|---|---|---|---|---|---|---|---|---|---|---|---|
| 1 | 2 | 3 | 4 | 5 | 6 | 7 | 8 | 9 | 10 | 11 | 12 | | |
| 0 | 0 | 0 | 0 | 0 | 0 | 0 | 0 | 0 | 0 | 0 | 0 | | 0TH FRAME |
| 0 | 0 | 0 | 0 | 0 | 0 | 0 | 0 | 0 | 0 | 0 | 0 | | 1ST FRAME |
| 1 | Q1 | R1 | S1 | T1 | U1 | V1 | W1 | 0 | 0 | 0 | 0 | | 2ND FRAME |
| 1 | Q2 | R2 | S2 | T2 | U2 | V2 | W2 | 0 | 0 | 0 | 0 | | 3RD FRAME |
| . | . | . | . | . | . | . | . | . | . | . | . | | |
| 1 | Q96 | R96 | S96 | T96 | U96 | V96 | W96 | 0 | 0 | 0 | 0 | | 97TH FRAME |

FIG. 10

CHANNEL STATUS CREATED FROM C BITS

| BIT | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | CONTROL | | | | | | MODE (0 0) | | CATEGORY CODE CC | | | | | | | |
| 16 | SOURCE NUMBER | | | | CHANNEL NUMBER | | | | SAMPLING FREQUENCY | | | | ACCURACY OF SAMPLING FREQUENCY | | | |
| 32 | BITS 32 TO 191 ARE NOT USED | | | | | | | | | | | | | | | |
| ... | | | | | | | | | | | | | | | | |
| 176 | | | | | | | | | | | | | | | | |

1 WORD (bits 0–15)

APPARATUS AND METHOD FOR RECORDING CONSTANT INTERVAL OF SILENCE

FIELD OF THE INVENTION

The present invention relates to a recording apparatus for recording audio data or the like onto a disc type recording medium.

BACKGROUND OF THE INVENTION

Disk media which allows data stored therein to be rewritten so that the user can record audio data or the like thereon is already generally known. In the case of an optical magnetic disk, a kind of such disk media, data recording is carried out by applying a laser light having a level higher than that of the playback operation typically by means of an optical head to one surface of the optical magnetic disk in order to heat up the surface to a temperature higher than the Curie point and, at the same time, applying an N or S magnetic field from the other-surface side by means of a magnetic head. Typically, a signal completing a predetermined modulation process is supplied to the magnetic head for generating the magnetic fields. In accordance with the modulated signal, the magnetic head applies an N or S magnetic field to the surface of the optical magnetic disk. Audio data is recorded on the surface as information on directions of the magnetic field. Such a recording apparatus is implemented by employing typically an optical magnetic disk, known as a mini-disk, as a recording medium.

Audio information to be recorded in such a recording apparatus is supplied typically from a source such as an analog tape player, an LP record player or a CD player. The audio information is originally an analog audio signal supplied by such a source through an analog output terminal thereof. The recording apparatus receives such an analog audio signal, converting it into digital data for recording. In addition, the digital output of a CD player such as an optical magnetic disk player or the digital output of a DAT player can be directly supplied to the recording apparatus as it is to be recorded therein.

By the way, audio signals supplied by a variety of sources may undergo dubbing recording. In some cases, the gap between two consecutive recorded programs is very long, inevitably giving rise to a sense of incompatibility felt by the listener during a playback operation.

For example, in the case of a playback operation in a CD player of the disk-exchange type wherein a program is played back from a disk selected from a plurality of disks, allowing the user to play back a desired composition comprising programs from desired disks, or in the case of an operation to play back a composition wherein desired programs thereof are selected in advance from a plurality of disks and played back in a programmed order, during a time between two consecutive played back programs, the player executes track-access and disk-replacement operations, supplying no played back signal to the recording apparatus for a period of time which extends to a certain degree in some cases. In such a case, recording an audio signal played back by the player into the recording apparatus as it is will inevitably create an excessively long soundless portion between two consecutive programs recorded on the disk which soundless portion corresponds to the time required for disk replacement and a track access carried out by the source. As a result, the listener feels a sense of incompatibility during a playback operation. On the top of that, the soundless time greatly differs from gap to gap between two consecutive programs, resulting in a disk having an ill shape as a product created by dubbing.

SUMMARY OF THE INVENTION

An object of the present invention is to provide a recording apparatus that prevents, to a certain degree, a gap between two consecutive programs on a recording medium, that is, a soundless portion between two consecutive programs from increasing in length, allowing well-shaped dubbing recording to be executed.

To achieve the above object, according to a preferred mode of the present invention, there is provided a recording apparatus for dividing an audio signal supplied thereto into predetermined blocks and recording the audio signal onto a recording medium in predetermined block units, which includes a level detector for detecting the level of the audio signal; a comparator for comparing a level detected by the level detector to a predetermined level; a block counter for counting the number of blocks in the audio signal when the comparator determines that the level of the audio signal is lower than the predetermined level; a discriminator for determining whether or not the number of blocks in the audio signal to be recorded onto the recording medium with a level lower than the predetermined level is greater than a predetermined value on the basis of contents of the block counter; and a controller for controlling a recording head in such a way that, when the discriminator determines that the number of blocks in the audio signal to be recorded onto the recording medium with a level lower than the predetermined level is greater than the predetermined value, the audio signal with a level lower than the predetermined level is written over an already recorded location on the recording medium till the level of the audio signal supplied to the level detector becomes higher than the predetermined level.

According to another preferred mode of the present invention, there is provided a recording apparatus for dividing an audio signal supplied thereto into predetermined blocks and recording the audio signal onto a recording medium in predetermined block units, which includes a level detector for detecting the level of the audio signal; a comparator for comparing a level detected by the level detector to a predetermined level; a time counter for measuring the lapse of time since detection of a level of the audio signal lower than the predetermined level as the comparator determines that the level of the audio signal is lower than the predetermined level; a discriminator for determining whether or not the audio signal to be recorded onto the recording medium with a level lower than the predetermined level continues for a period longer than a predetermined time on the basis of contents of the time counter; and a controller for controlling a recording head in such a way that, when the discriminator determines that the audio signal to be recorded onto the recording medium with a level lower than the predetermined level continues for a period longer than the predetermined time, the audio signal with a level lower than the predetermined level is written over an already recorded location on the recording medium till the level of the audio signal supplied to the level detector becomes higher than the predetermined level.

According to the present invention, when a soundless state of the audio input supplied to the recording apparatus side continues for a relatively long period of time due to a track jump or a disk replacement taking place in equipment on the source side such as a CD player during dubbing recording, the soundless block data is recorded repeatedly on the same area of the recording medium, preventing a soundless portion (between two consecutive programs) on the recording medium from excessively increasing in length.

The above and other features and advantages of the present invention will becomes apparent from the following description which will be given with reference to the illustrative accompanying drawings.

BRIEF DESCRIPTION OF THE DRAWINGS

FIG. 2A is a diagram showing the structure of data recorded on a disk in accordance with the present invention;

FIG. 2B is a diagram showing a data structure of a cluster;

FIG. 2C is a diagram showing a data structure of a sector;

FIG. 2D is a diagram showing a data structure of a sound group;

FIG. 2E is a diagram showing a data structure of a sound frame;

FIG. 3 is a diagram showing a data structure of Sector 0 of a U-TOC;

FIG. 7A is a diagram showing a data structure of a subcode Q channel on a compact disk;

FIG. 7B is a diagram showing a data structure of a subcode Q channel on an optical magnetic disk in accordance with the present invention;

FIG. 8A is a diagram showing a data structure of audio information received through a digital interface;

FIG. 8B is a diagram showing a data structure of one channel received through the above digital interface;

FIG. 9 is a diagram showing U-bit data received through the digital interface;

FIG. 10 is a diagram showing C-bit data received through the digital interface;

DETAILED DESCRIPTION OF THE PREFERRED EMBODIMENTS

First to sixth embodiments of a recording apparatus of the present invention will be described by referring to FIGS. 1 to 17. The description is given one paragraph after another in an order shown by the following list of paragraphs. It should be noted that the explanation of an apparatus configuration, signal formats and the like is common to all the embodiments. In the later part of this section, a processing technique is described for each of the embodiments.

1. Configuration of Recording/Playback Apparatus

Figure 1:
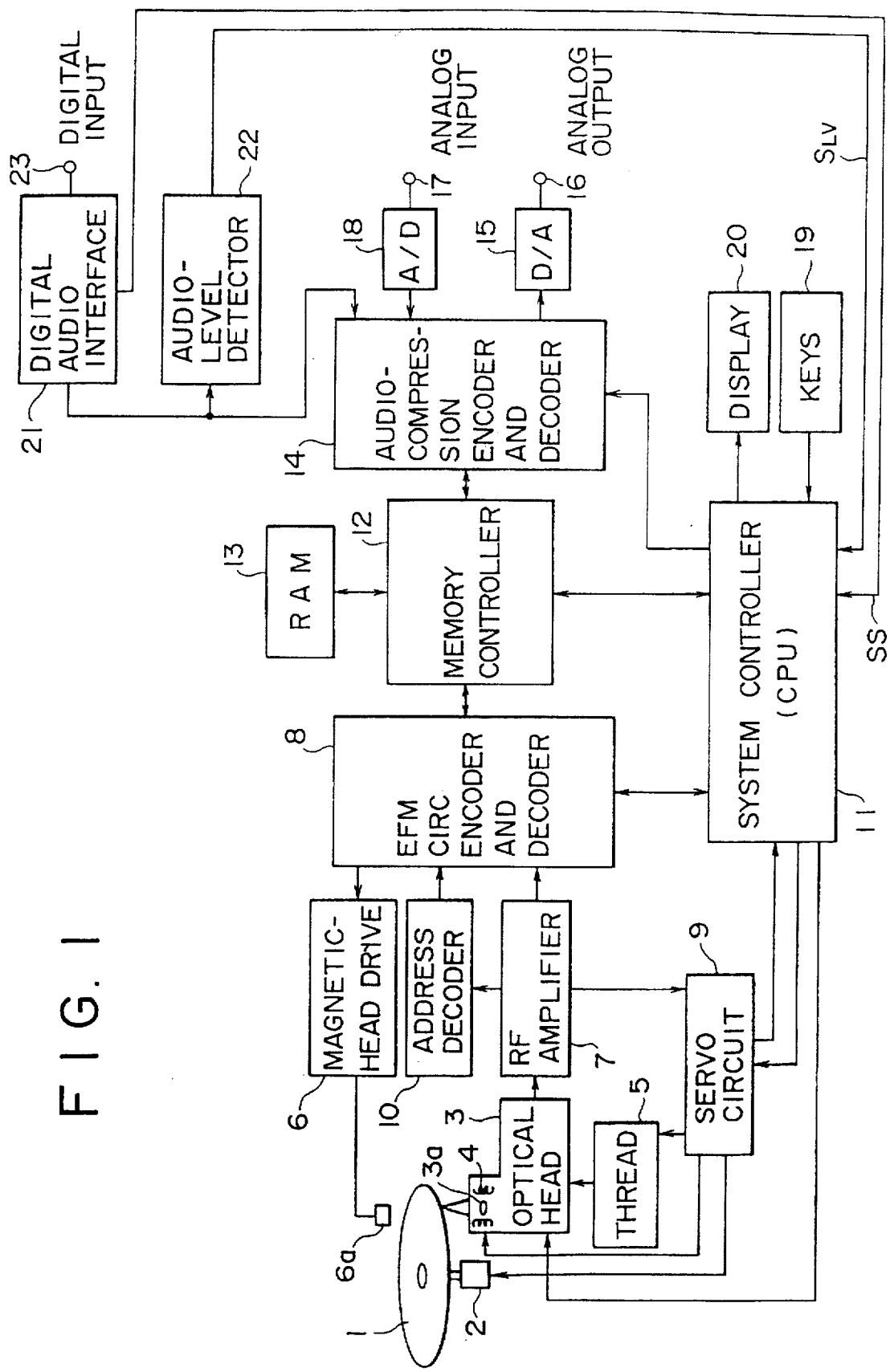
FIG. 1 is a block diagram illustrating the present invention.

FIG. 1 is a block diagram of principal components of a recording/playback apparatus of the present invention which employs an optical magnetic disk as a recording medium.

Reference numeral 1 shown in the FIG. 1 is an optical magnetic disk for recording a plurality of programs containing audio information or the like. The optical magnetic disk 1 is driven into rotation by a spindle motor 2. Reference numeral 3 is an optical head for applying a laser light to the optical magnetic disk 1 during recording or playback operation. In a recording operation, the optical head 3 outputs a high-level laser light for heating a recording track to the Curie point, a temperature of about 180 degrees Celsius. During a playback operation, on the other hand, the optical head 3 outputs a laser light at a relatively low level for detecting data from a light reflected by Kerr's effect.

The optical head 3 is mounted with optical components serving as a laser outputting means and a detector for detecting a reflected light. The optical components include a laser diode, a polarizing beam splitter and an object lens $3a$. The object lens $3a$ is held by a double-axis mechanism 4 in such a way that the object lens $3a$ can be displaced in the disk radial direction and the directions of approaching and leaving the optical magnetic disk 1. In addition, the entire assembly of the optical head 3 can be moved in the radial direction of the disk by a thread mechanism 5.

Reference numeral $6a$ is a magnetic head for applying a magnetic field modulated by supplied data to the optical magnetic disk 1. The magnetic head $6a$ is installed at a counterpart position having the same coordinates as that of the optical head 3 on the other side of the optical magnetic disk 1. That is to say, the optical head 3 and the magnetic head $6a$ sandwich the optical magnetic disk 1. The magnetic head $6a$ can be moved in the disk radial direction by the thread mechanism 5 along with the optical head 3.

Information from the optical magnetic disk 1 detected by the optical head 3 in a playback operation is supplied to an RF amplifier 7. The RF amplifier 7 processes the information supplied thereto, extracting, among other data, a playback RF signal, a tracking-error signal, a focus-error signal and group information. The extracted playback RF signal is then supplied to an encoder-and-decoder unit 8. On the other hand, the tracking-error signal and the focus-error signal are supplied to a servo circuit 9. (A recordable disk is injection molded. Tracking control is carried out by using a groove. A pre-groove is also used for superimposing sinusoidal waves and addresses by forming them, applying a CLV (Constant Linear Velocity) servo throughout the disk area). The group information is supplied to an address decoder 10 to undergo demodulation. Address information decoded from the group information and address information recorded as data and decoded by the encoder-and-decoder unit 8 are supplied to a system controller 11 which includes a microcomputer in the configuration thereof. Also extracted are subcode data, a focus monitor signal, a CLV (Constant Linear Velocity) clock information and other kinds of data which are then supplied to the system controller 11.

Receiving the tracking-error signal, the focus-error signal as well as inputs from the system controller 11 such as a track-jump command, an access command and rotational-speed detection information, the servo circuit 9 generates a variety of servo drive signals for controlling the double-axis mechanism 4 and the thread mechanism 5, which carry out the focus and tracking control, and controlling the spindle motor 2 into a constant linear velocity (CLV).

The playback RF signal undergoes EFM demodulation (or eight-fourteen demodulation), a decoding process of the CIRC (Cross Interleave Re Solomon Coding) and other processes in the encoder-and-decoder unit 8 before being temporarily stored in a RAM (Random-Access Memory) unit 13 by a memory controller 12. It should be noted that data is read out from the optical magnetic disk 1 by the optical head 3 and played-back data is transferred from the optical head 3 to the RAM unit 13 at a speed of 1.41 Mbit/sec.

The data stored in the RAM unit 13 is read out with timing that gives a playback-data transfer speed of 0.3 Mbit/sec and then supplied to an encoder-and-decoder unit 14. In the encoder-and-decoder unit 14, the data undergoes playback-signal processings such as a decoding process, an inverse process of the audio compression based on the modified DCT (Discrete Cosine Transform) process. The data is then supplied to a D/A (digital to analog) converter 15 for converting the data into an analog signal which is then supplied to a predetermined amplifier circuit through a terminal 16 before being output as playback signals. Typically, the playback signals are output as audio signals of left and right channels.

In the execution of an operation to record an analog audio signal transferred to the optical magnetic disk 1, the analog audio signal is received typically from a CD player, a tape player or another player of an optical magnetic disk through a terminal 17.

The recording signal (or the analog audio signal described above) supplied through the terminal 17 is converted by an A/D (analog to digital) converter 18 at a sampling rate of 44.1 KHz into 16-bit quantized digital data before being supplied to the encoder-and-decoder unit 14 to undergo an audio compression encoding process. That is to say, the amount of the digital data is compressed to about one-fifth by means of the modified DCT processing.

The recording data compressed by the encoder-and-decoder unit 14 is stored temporarily in the RAM unit 13 by the memory controller 12. The data is then read out from the RAM unit 13 with predetermined timing and supplied to the encoder-and-decoder unit 8. In the encoder-and-decoder unit 8, the data undergoes encoding processes such as CIRC encoding and EFM modulation before being supplied to a magnetic-head drive circuit 6.

The magnetic-head drive circuit 6 provides the magnetic head 6a with a magnetic-head drive signal in accordance with the encoded recording data. In turn, the magnetic head 6a applies an N or S magnetic field to the optical magnetic disk 1. In addition, the system controller 11 at that time supplies a control signal to the optical head 3, requesting the optical head 3 to output a laser light at the recording level.

Reference numeral 23 is a terminal serving as a digital audio interface with external equipment. Data input from the terminal 23 is supplied to a digital audio interface unit 21.

With such a digital audio interface 21 furnished, audio information reproduced by an external CD player or an optical magnetic disk player can be supplied as digital data as it is. At the same time, control data including, among other things, subcode information of the player is received with a predetermined format.

In the digital audio interface unit 21, audio data (which has a sampling rate of 44.1 KHz and is quantized into 16 bits) is extracted from the data supplied thereto, and the extracted audio data is then provided to the encoder-and-decoder unit 14 as recording data.

In addition, the control data SS such as the subcode information and the like is also extracted and then supplied to the system controller 11. The control data SS transmitted from the CD player or the like typically includes U-bit data, C-bit data, V-bit data and P-bit data.

The U-bit data includes subcode data known as the so-called Q, R, S, T, U, V and W data. In addition, the C-bit data includes, among other information, category data used for distinguishing the recording medium, sampling-frequency data, clock data and optical-system data. Further, the V-bit data includes, among other information, an error flag. Finally, the P-bit data is interpreted as a parity bit.

Formats in the digital audio interface 21 regarding these pieces of control data will be described later. The system controller 11 utilizes some necessary pieces of the control data SS for controlling a variety of recording operations.

Reference numeral 22 is an audio-level detecting unit for detecting the level of audio data transmitted by the digital audio interface 21. The detected level information $S_{LV}$ is supplied to the system controller 11. The system controller 11 utilizes the level information $S_{LV}$ for determining whether or not audio data exists in the signal supplied to the encoder-and-decoder unit 14, controlling the recording operation depending upon whether of not the audio data exists.

Reference numeral 19 is an operation input unit equipped with keys utilized by the user for entering operation commands. Reference numeral 20 is a display unit including typically a liquid-crystal display.

The operation input unit 19 has a recording key, a playback key, a stop key, an AMS (Auto Music Sensor) key, a search key and the like used for facilitating user operations.

On the display unit 20, various kinds of information such as a total playback time of the disk, time information such as a cumulative recording or playback time, a program number, the operation status and the operating mode are displayed under the control of the system controller 11.

When recording or playing back a signal on or from the optical magnetic disk 1, it is necessary to read out control information recorded on the disk 1. The control information includes a P-TOC (Pre-mastered Table of Contents) and a U-TOC (User Table of Contents). The system controller 11 identifies the address of an area for recording a signal on the optical magnetic disk 1 or an area, from which a signal is to be played back, in accordance with the control information. The control information is stored in the RAM unit 13. For this reason, the RAM unit 13 is configured by dividing it into a buffer area for storing recording or reproduced data and an area for holding the control information.

At the time the optical magnetic disk 1 is mounted, the system controller 11 reproduces the control information from the innermost circumference of the disk 1, storing the control information in the RAM unit 13 so that, when a recording or playback operation is carried out later on the disk 1, the control information in the RAM unit 13 can be referenced with ease. It should be noted that the control information was recorded on the innermost circumference of the optical magnetic disk 1 in advance.

The U-TOC can be re-edited and re-written when new data is recorded or existing data is deleted. The system controller 11 performs edit processing on the U-TOC information stored in the RAM unit 13 every time data recording or deletion is carried out. Then, the U-TOC area on the optical magnetic disk 1 is updated with predetermined timing in accordance with the new contents re-written in the U-TOC stored in the RAM unit 13.

The P-TOC is recorded on the optical magnetic disk 1 as bit data, including a basic disk structure such as addresses of optical magnetic areas, on which data can be recorded, a lead-out area and the U-TOC area. The P-TOC also includes track control information for exclusive playback use in the case of a pre-mastered disk for playback operations only or a hybrid disk in which both playback-only and recordable areas coexist.

On the other hand, the U-TOC includes information on recordable areas (or free areas), track control information of recorded programs and text information as well as a date and a time pertaining to each program.

In addition, the recording of audio data described above is carried out in predetermined data block units. In the case of the optical magnetic disk apparatus of the present invention, a block unit corresponds to 1 cluster. In a recording operation, when data of the amount equal to 1 cluster is accumulated in the RAM unit 13, the system controller 11 transfers the data to the encoder-and-decoder unit 8 to undergo encoding processes such as CIRC encoding and EFM modulation before being supplied to a magnetic-head drive circuit 6 to be finally recorded onto the optical magnetic disk 1.

2. Cluster Format

The format of a cluster adopted as a unit in a recording operation in the optical magnetic disk apparatus of the present invention is shown in FIGS. 2A to 2E.

As shown in FIG. 2A, a recording track in an optical magnetic disk apparatus of the present invention comprises a sequence of clusters CL each used as a smallest unit in a recording operation. One cluster corresponds to 2 to 3 track circles.

As shown in FIG. 2B, 1 cluster CL comprises 4 sectors used as a subcode area and 32 sectors used as a main-data area. It should be noted that 1 sector comprises 2,352 bytes.

The 4-sector subdata area is used for storing subcodes and as a linking area. TOC data, audio data and other information are stored in the 32-sector main-data area.

It should be noted that an address is recorded for each sector.

As shown in FIG. 2D, a sector further comprises finer sound groups. Eleven sound groups are accommodated in 2 sectors. Each sound group comprises 424 bytes. Left-channel data and right-channel data are recorded in the left 212 bytes and the right 212 bytes of a sound group respectively. A sound group accommodates audio data of an amount corresponding to a playback time of 11.61 msec. Thus, it takes about 2 seconds to play back audio data from 1 cluster.

It should be noted that the left or right 212 bytes of a sound group for recording left-channel or right-channel audio data are referred to as a sound frame.

3. U-TOC

U-TOC sectors stored as sector data in the optical magnetic disk 1 will be described as follows.

A format of the first sector (Sector 0) of the U-TOC is shown in FIG. 3. This first sector is a data area for recording control information of recordable areas (or free areas) for mainly programs recorded by the user and new programs. The U-TOC can be set to occupy Sector 0 to Sector 7. Sector 1 and Sector 4 are used as areas for recording text information whereas Sector 2 is used as an area for keeping a recording date and a recording time.

When a program is recorded on the optical magnetic disk 1, the system controller 11 searches Sector 0 of the U-TOC for information on a free area in which audio data can be recorded. In a playback operation, on the other hand, information on an area for recording a program to be played back is identified from Sector 0 of the U-TOC. The area is then accessed to play back the program.

As shown in FIG. 3, the first 12 bytes of Sector 0 of the U-TOC are used for recording a synchronization pattern. An address (Cluster H and Cluster L) is recorded in the 2 subsequent bytes as a header. In addition, at predetermined address positions, pieces of information such as a manufacturer code (Maker code), a model code, a first-program number (First TNO), a last-program number (Last TNO), sector utilization (Used sectors), a disk serial number and a disk ID are recorded.

Furthermore, an area for recording a variety of table pointers (P-DFA, P-EMPTY, P-FRA and P-TNO1 to TNO255) is provided as a data segment pointing to associated tables. The table pointers each point to one of the associated tables with which an area used by the user for recording a program or a free area is associated.

The associated-table segment, the area for recording the associated tables, can accommodate up to 255 part tables (associated tables) which are assigned numbers (01h) to (FFh). Each part-table entry includes a start address of the originating point of a part, an end address of the end of the part and mode information (a track mode) of the part. Furthermore, in some cases, a part described by a part table may be linked to another part described by another part table in which the start and end addresses of the other part are recorded. For this reason, a field is provided in each of the part tables for recording link information used for linking one part table to another. A part is defined as a track portion comprising contiguous physical locations for recording data input during a continuous period of time.

It should be noted that a suffix 'h' appended to a number throughout this specification indicates that the number has a hexadecimal format.

In this recording/playback apparatus, even if data of a program is recorded at physically noncontiguous locations, that is, recorded in an area comprising a plurality of scattered parts, a playback operation can be carried out while the parts are being accessed one after another, giving rise to no problems in the playback operation. To put it in more detail, as described in Paragraph 1 with the title "Configuration of Recording/Playback Apparatus," reproduced audio information is read back from the RAM unit 13 after being temporarily stored therein. In addition, the transfer rate of data read from the RAM unit 13 is made lower than that of data written thereto. As a result, even if the operation to write data into the RAM unit 13 is halted while a part is being accessed, the operation to read out data from the RAM unit 13 can be carried out continuously, allowing an uninterrupted playback operation. In order to utilize recordable areas efficiently, in some cases, a program that the user wants to record is recorded by deliberately dividing the program into a plurality of parts.

For this reason, link information is provided. Typically, the numbers 01h to FFh assigned to the part tables are used to specify a part table to be linked. In this way, a part table can be linked to another. It should be noted that, in actuality, a byte position in Sector 0 of the U-TOC is used to specify a part table to be linked through predetermined processing.

Each part table of the control-table segment in Sector 0 of the U-TOC represents a part. In the case of a program comprising, for example, three parts linked to each other, each part location is controlled by the three part tables which are linked to each other by link information.

Contents of parts represented by the part tables (01h) to (FFh) in the part-table segment of Sector 0 of the U-TOC are described by the table pointers P-DFA, P-EMPTY, P-FRA and P-TNO1 to P-TNO255 as follows.

The table pointer P-DFA (Pointer for Defective Areas) points to a part table of defective areas on the optical magnetic disk 1. Defective areas due to injuries or the like are treated as a part or parts which are represented by a part table or a plurality of part tables. The table pointer P-DFA points to the part table representing the defective parts or a head part table of a plurality of part tables in the case of more than one part table used for representing the defective parts. To be more specific, the table pointer P-DFA contains one of the values 01h to 0Fh, the number of a part table representing an existing defective part. The start and end addresses of the defective part are recorded respectively in the start-address and end-address fields of the part table pointed to by the table pointer P-DFA. Another defective part, if any, is represented by another part table which is linked to the part table pointed to by the table pointer P-DFA by means of link information recorded in the part table pointed to by the table pointer P-DFA. Similarly, the other part table contains the start and end addresses of the other defective part. If no other defective part exist, the link information is set typically at the value "00h" to indicate that there is no further linked part table.

The table pointer P-EMPTY (Pointer for an Empty Slot) points to an unused part table or a head part table of a plurality of unused part tables. To be more specific, the table pointer P-EMPTY contains one of the values 01h to FFh, the number of an unused part table. If a plurality of unused part table exist, the first one is pointed to by the table pointer P-EMPTY and the second one is linked to the first one by means of link information recorded in the first one. Likewise, any succeeding unused part table is linked to the preceding unused part table by means of link information recorded in the preceding unused part table. In this way, all unused part tables in the control-table segment are linked to each other.

The table pointer P-FRA (Pointer for Freely Recordable Areas) points to a part table of areas on the optical magnetic disk 1 to which areas data can be recorded. The areas include ones from which data has been erased. Such free areas are treated as a part (track portion) or parts which are represented by a part table or a plurality of part tables. The table pointer P-FRA points to the part table representing the free parts or a head part table of a plurality of part tables in the case of more than one part table used for representing the free parts. To be more specific, the table pointer P-FRA contains one of the values 01h to FFh, the number of a part table representing an existing free part. The start and end addresses of the free part are recorded respectively in the start-address and end-address fields of the part table pointed to by the table pointer P-FRA. Another free part, if any, is represented by another part table which is linked to the part table pointed to by the table pointer P-FRA by means of link information recorded in the part table pointed to by the table pointer P-FRA. Similarly, the other part table contains the start and end addresses of the other free part. If no other free part exist, the link information is set typically at the value "00h" to indicate that there is no further linked part table. A plurality of such free parts are represented by as many part tables as the free parts in the same way. Link information recorded in a part table points to a succeeding part table which contains link information pointing to another succeeding part table. This linking is continued from one part table to another up to a part table having link information of "00h".

Figure 4:
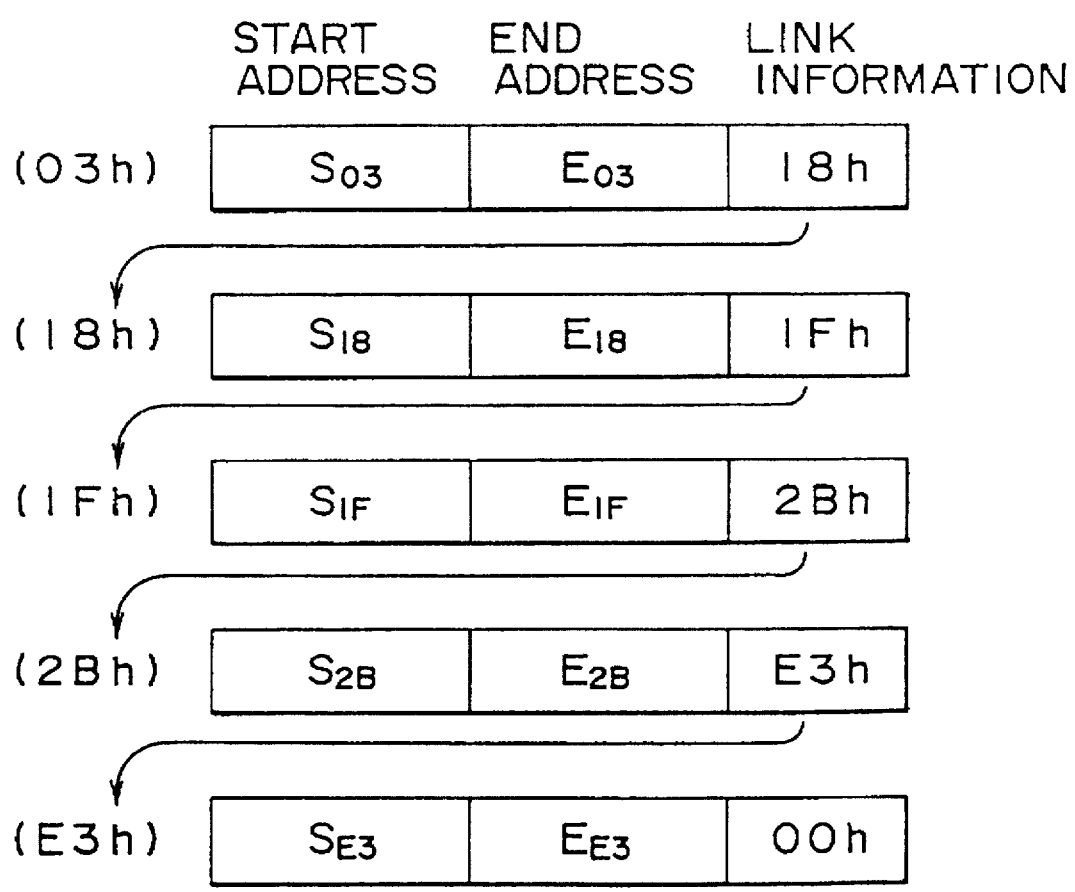
FIG. 4 is a diagram showing a linking state of parts.

A model representing part tables each representing a free part which part tables are linked to each other is shown in FIG. 4. In this case, part tables (03h), (18h), (1Fh), (2Bh) and (E3h) each represent a free part. As shown in the figure, the table pointer P-FRA points to the first (head) part table (03h) which points to the following part table (18h) and so on. In this way, a link of successive part tables (03h), (18h), (1Fh), (2Bh) and (E3h) is created.

It should be noted that part tables representing defective parts and unused part tables are controlled in the same way as part tables representing free parts described above.

In the case of a virgin optical magnetic disk in which no audio data is recorded at all and no defective areas exist, the table pointer P-FRA points to the part table (01h) to indicate that all recordable areas on the disk are free areas. In this case, since the remaining part tables (02h) to (FFh) are not used, the table pointer P-EMPTY points to the part table (02h). The link information recorded in the part table (02h) points to the part table (03h) and so on. In this way, the remaining part tables (02h) to (FFh) are linked to each other, ending with the part table (FFh). In this case, link information of "00h" is recorded in the part table (FFh) to indicate there is no longer part table to be linked.

It should be noted that, in this case, the start address of the recordable user areas is recorded in the start-address field of the part table (01h) and an address immediately preceding a lead-out start address is recorded in the end-address field of the part table (01h).

The table pointers P-TNO1 to P-TNO255 points to the part tables (01h) to (FFh) which each represent a part on the optical magnetic disk 1 used by the user for recording a program. For example, the table pointer P-TNO1 points to a part table representing a part or the first part among a plurality of parts which are chronologically used for recording data of a first program.

Let the above first program be accommodated in a single part on the optical magnetic disk instead of a plurality of parts physically separated from each other. In this case, the start and end addresses of an area for recording the first program are recorded respectively in the start-address and end-address fields of the part table pointed to by the table pointer P-TNO1.

Let a second program be recorded in a plurality of parts on the optical magnetic disk separated from each other. In this case, in order to indicate the recording location of the program, the parts are specified one after another sequentially in the same order as they are chronologically used for recording the program. To be more specific, the table pointer P-TNO2 points to the first part table on the chronological list of part tables. The link information in the first part table points to the second part table on the chronological list. Likewise, the successive part tables are linked to each other with a succeeding part table pointed to by link information of a part table preceding it. The linking of part tables is continued up to the last part table which contains link information of "00h". The linked list of part tables resembles that shown in FIG. 4.

When the second program is played back or data is overwritten into areas for recording the second program, the optical head 3 and the magnetic head 6 are driven to access the areas in accordance with data recorded in Sector 0 of the U-TOC, allowing continuous audio signal to be fetched from the parts separated from each other or the recording areas to be used for recording data efficiently.

As described above, addresses of recorded programs and free areas are controlled by the U-TOC. When a change in program number for audio data is encountered in a recording operation, the U-TOC is updated accordingly so as to treat the recording data as a different program in the U-TOC.

4. Subcodes

In this paragraph, subcodes recorded in a CD and an optical magnetic disk will be described.

As is already generally known, a smallest unit for recording data in a CD system is 1 frame and 1 block comprises 98 frames.

Figures 5, 6:
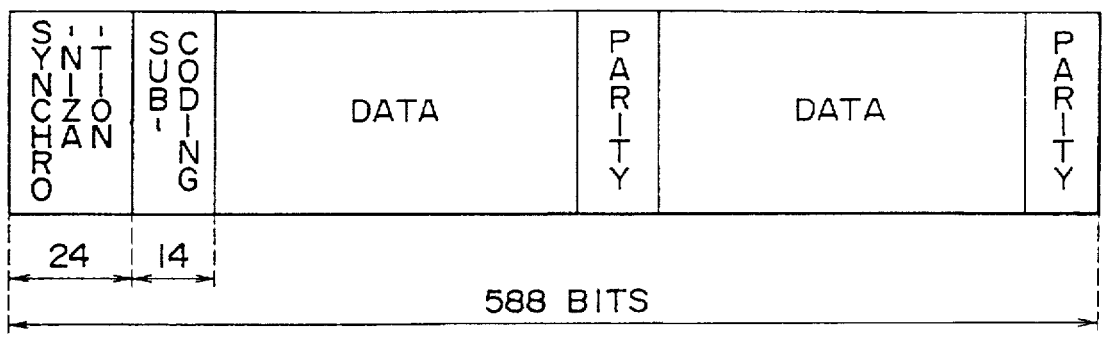
FIG. 5 is a diagram showing a data structure of 1 frame of subcodes.
FIG. 6 is a diagram showing a data structure of 1 block of subcodes.

The structure of a frame is shown in FIG. 5. As shown in the figure, a frame comprises 588 bits. The first 24 bits are used for recording synchronization data whereas the subsequent 14 bits are for subcode data. The following bits are used for recording data and parity information.

With a frame configured in this way, a block comprises 98 frames. Pieces of subcode data are fetched from 98 frames and collected to form subcode data of a block shown in FIG. 6.

Pieces of subcode data fetched from the first and second frames at the head of the 98 frames, that is, Frame 98n+1 and Frame 98n+2, are each used as a synchronization pattern. Pieces of subcode data fetched from the 3rd frame to the 98th frame, that is, from Frame 98n+3 to Frame 98n+98, form 96-bit pieces of channel data or 96-bit subcode data of P, Q, R, S, T, U, V and W channels.

The P and Q channels are used for controlling accesses and the like. However, the P channel merely shows a post portion between programs. Finer control requires the Q channel ($Q_1$ to $Q_{96}$). In the case of a CD, the format of the 96-bit data of the Q channel is shown in FIG. 7A.

The first 4 bits, $Q_1$ to $Q_4$, are used for recording control data CTL including the number of audio channels, the emphasis information and a CD-ROM identification.

To be more specific, the 4-bit control data is defined as follows:

"0***" ———— 2 audio channels
"1***" ———— 4 audio channels
"*0**" ———— CD-DA (CD digital audio)
"*1**" ———— CD-ROM
"**0*" ———— Digital copy can not be done
"**1*" ———— Digital copy can be done
"***0" ———— With no preemphasis
"***1" ———— With preemphasis The following 4 bits, $Q_5$ to $Q_8$, are used for recording an address Ad to be followed by $Q_9$ to $Q_{80}$, control bits of data.

A 4-bit address of "0001" indicates that sub-Q data in the following $Q_9$ to $Q_{80}$ bits is Q data of an audio CD.

Bits $Q_9$ to $Q_{80}$ are used for recording 72-bit sub-Q data and the remaining $Q_{81}$ to $Q_{96}$ bits are for a CRC (Cyclic Redundancy Check Codes).

The 72 bits subcode, $Q_9$ to $Q_{80}$, are used for recording nine 8-bit pieces of information as shown in FIG. 7A. The first 8-bit piece of information is a program number (TNO) which can be one of the numbers "01" to "99" representing program numbers #1 to #n. The track number for a lead-out area is "AA".

Following the program number is an index, information which allows a program to be divided into finer portions.

Following the index are the lapse of time along a track expressed in terms of minutes in the MIN field, seconds in the SEC field and a frame number in the FRAME field. An absolute time address is recorded in terms of minutes in the AMIN field, seconds in the ASEC field and a frame number in the AFRAME field. The absolute time address is absolute time information appended continuously up to a lead-out coming later with the start point of the first track taken as a reference of 0 minutes, 0 seconds and 0 frame number. In other words, the absolute time address is absolute time information used for controlling tracks on the disk.

On the other hand, the structure of the Q data for an optical magnetic disk is shown in FIG. 7B.

As shown in the figure, the Q data comprises a program number (TNO), index information (INDEX) and a CRC code. No time information is included.

The recording/playback apparatus of the present invention can be connected to other equipment such as a CD player or an optical magnetic disk player through a digital audio interface. When reproduced data is supplied from the external equipment, the transmitted data includes playback audio data and information based on these subcodes. In the recording/playback apparatus of the present invention, an apparatus that serves as a recorder during a dubbing operation, a change in program number in playback-side audio data can be detected from the subcode information of the playback side.

5. Digital Audio Interface

A format of data transmitted by playback equipment to the recording/playback apparatus of the present invention through a digital audio interface will be described.

A format of the digital audio interface, referred to hereafter as an I/O format, is shown in FIGS. 8A and 8B.

According to the I/O format shown in FIG. 8A, a sampling period (1/Fs) is treated as a frame which is used as a basic unit. A frame comprises digital output signals of the left (L) and right (R) channels. The digital output signals are transmitted in an order starting with the LSB (Least Significant Bits) of the left channel followed by the MSB (Most Significant Bits) of the left channel and the LSB (Least Significant Bits) of the right channel and ending with the MSB (Most Significant Bits) of the right channel.

The audio data pertaining to a channel is called a subframe, the configuration of which is shown in FIG. 8B.

A subframe comprises 32 bits. Two consecutive subframes of the left and right channels constitute a frame.

The four bits at the head of a subframe are used for specifying a preamble which is used for synchronization and for identifying the subframe.

The following four bits are a reserved field (AUX) followed by 20-bit audio data $D_A$, the main data of the subframe.

Following the audio data $D_A$ are four 1-bit pieces of control data denoted by capital characters V, U, C and P respectively.

The V bit is a valid flag. A valid-flag value of "0" indicates that the data of the subframe is valid (or reliable). A valid-flag value of "1", on the other hand, indicates that the data of the subframe is invalid (or unreliable). By referencing the valid flag, equipment on the receiving side can make a decision concerning an operation to process the data.

The U bit is user data. The U bits, each contained in a transmitted subframe, are collected to produce data comprising an average of 1,176 bits as shown in FIG. 9. An example shown in FIG. 9 is control data expressing subcodes.

Pieces of data in 0th and 1st frames shown in FIG. 9 are the subcode synchronization patterns shown in FIG. 6. It should be noted that 12 U bits are collected in each frame shown in FIG. 9 but, in this example, the last 4 bits in each frame are dummy bits.

The start bit in each of the 2nd to 97th frames is a "1". The start bit is followed by Q to W bits of the subcodes shown in FIG. 6 and the 4 dummy bits.

In other words, the U bits of subframes are filled with the Q to W data of the subcodes of a CD or an optical magnetic disk on the playback side as it is. In the case of the example shown in FIG. 9, the distance from a start bit to a next one is 12 bits in length. It should be noted, however, that by changing the number of dummy bits, the distance from a start bit to a next one can be varied, ranging from 8 to 16 bits.

The C bit shown in FIG. 8B indicates the status of the channel.

The C bits, each contained in a transmitted subframe, are collected to produce a 192-bit word conforming to a prescribed data format shown in FIG. 10. Shown in FIG. 10 is the format of the channel status.

The first bit (Bit 0) of the word is used to distinguish a home transmitter from an industrial one. Control information is recorded in the next 5 bits, Bit 1 to Bit 5. For example, Bit 2 is an identification bit indicating the existence/non-existence copyright protection whereas Bit 3 is an identification bit indicating the existence/non-existence of emphasis.

Bit 8 to Bit 15 that follow are used for specifying a category code CC. Bit 15 is called an L bit indicating the generation of the digital audio data. In general, in the case of recorded software issued for industrial use, Bit 15 is a "1". Bits 8 to Bit 14 are used for recording a specific code in accordance with the equipment on the transmitting side.

For example, let the transmitter be an optical magnetic disk apparatus. In this case, the category code CC is prescribed to be "1001001L". In the case of a compact-disk system serving as a transmitter, on the other hand, the category code CC is prescribed to be "1000000L".

Bit 16 to Bit 19 that follow are used for specifying a source number. A source number is used for identifying a specific piece of equipment among a plurality of connected units pertaining to the same category.

Bit 20 to Bit 23 that follow are used for specifying a channel number. A channel number is used for specifying the channel type of the digital audio interface.

Bit 24 to Bit 27 that follow are used for specifying an identification code of the sampling frequency. Bit 28 to Bit 29 that follow are used for specifying the accuracy of the sampling frequency.

Finally, Bit 32 and the subsequent bits are not used.

The P bit shown in FIG. 8B is a parity bit. The parity bit is typically an even parity for detecting an error existing among the spare bits, the audio data $D_A$ and the V, U and C bits.

6. Processing Example as a First Embodiment

In this embodiment, there will be described processing carried out by the recording/playback apparatus of the present invention to record audio data received through the digital audio interface described above onto the optical magnetic disk 1 or, in particular, to handle a portion between two consecutive programs.

Figure 11:
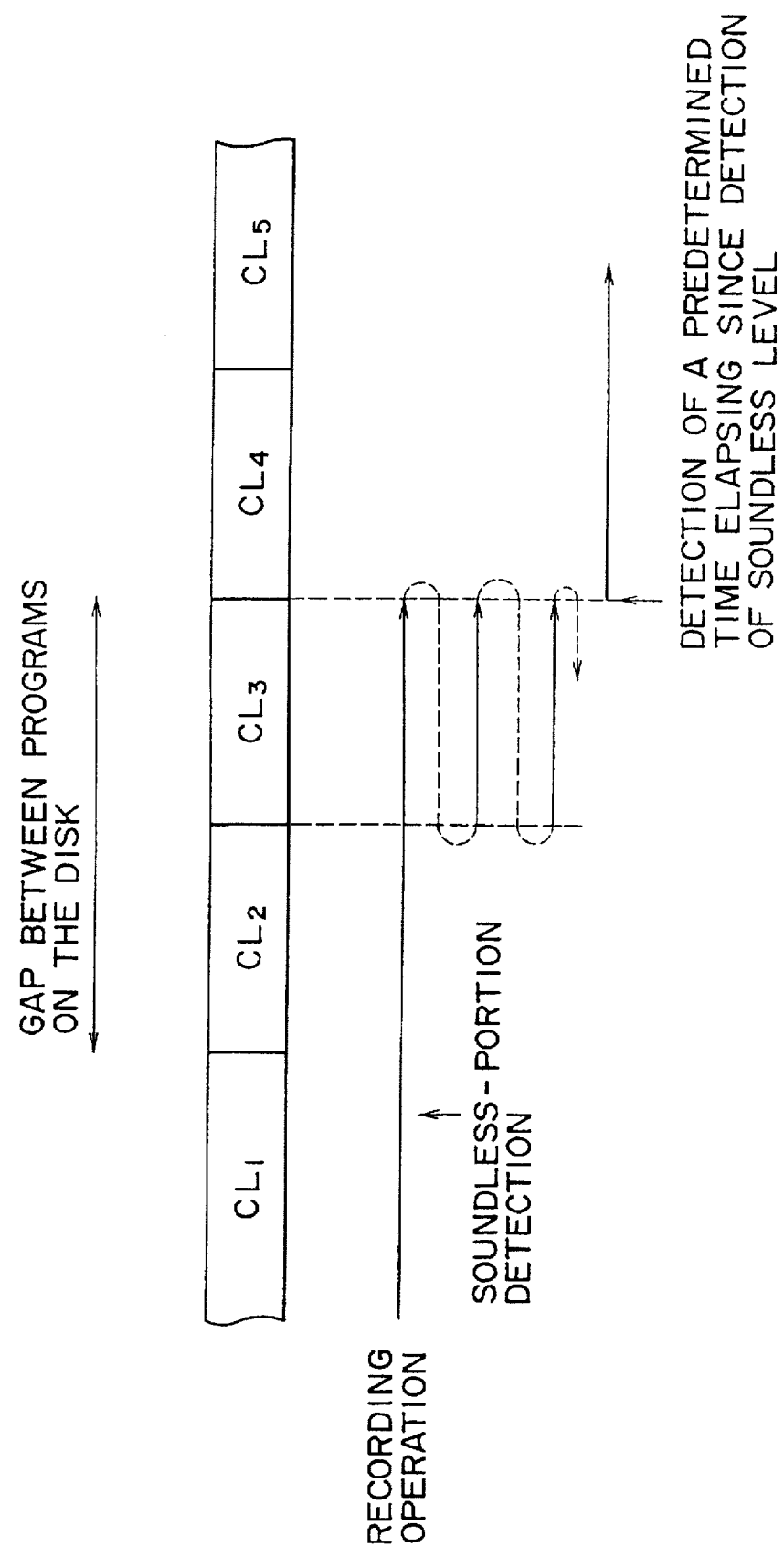
FIG. 11 is a diagram showing control of the recording of a gap between two consecutive programs on a disk in accordance with the present invention.

It should be noted that the recording operation between two consecutive programs in the first to sixth embodiments is basically carried out in accordance with a model shown in FIG. 11.

Let, for example, an audio signal supplied from equipment such as a CD player be recorded onto the optical magnetic disk 1 and, at that time, a soundless state be detected due to the termination of a program in the course of a block, a cluster $CL_1$ shown in the figure. The following cluster $CL_2$ is a block of the audio signal containing soundless data. Let the soundless state continue further. In this case, the operation carried out by the recording/playback apparatus to record audio data onto the optical magnetic disk 1 turns to be an operation to repeatedly record soundless data of the subsequent clusters onto the same location of the cluster $CL_3$ on the disk 1 as indicated by an arrow shown in the figure.

Later on, as the supply of an audio signal of the next program is detected at a certain point, data starting at this point is recorded onto the disk 1 as data for a cluster $CL_4$. That is to say, by recording data received during a soundless period into the same area on the disk 1 repeatedly, the soundless-data portion on the disk 1 can be sustained to a certain degree at a constant length even if the soundless period extends, allowing a well-shaped recording to be executed between two consecutive programs.

Figure 12:
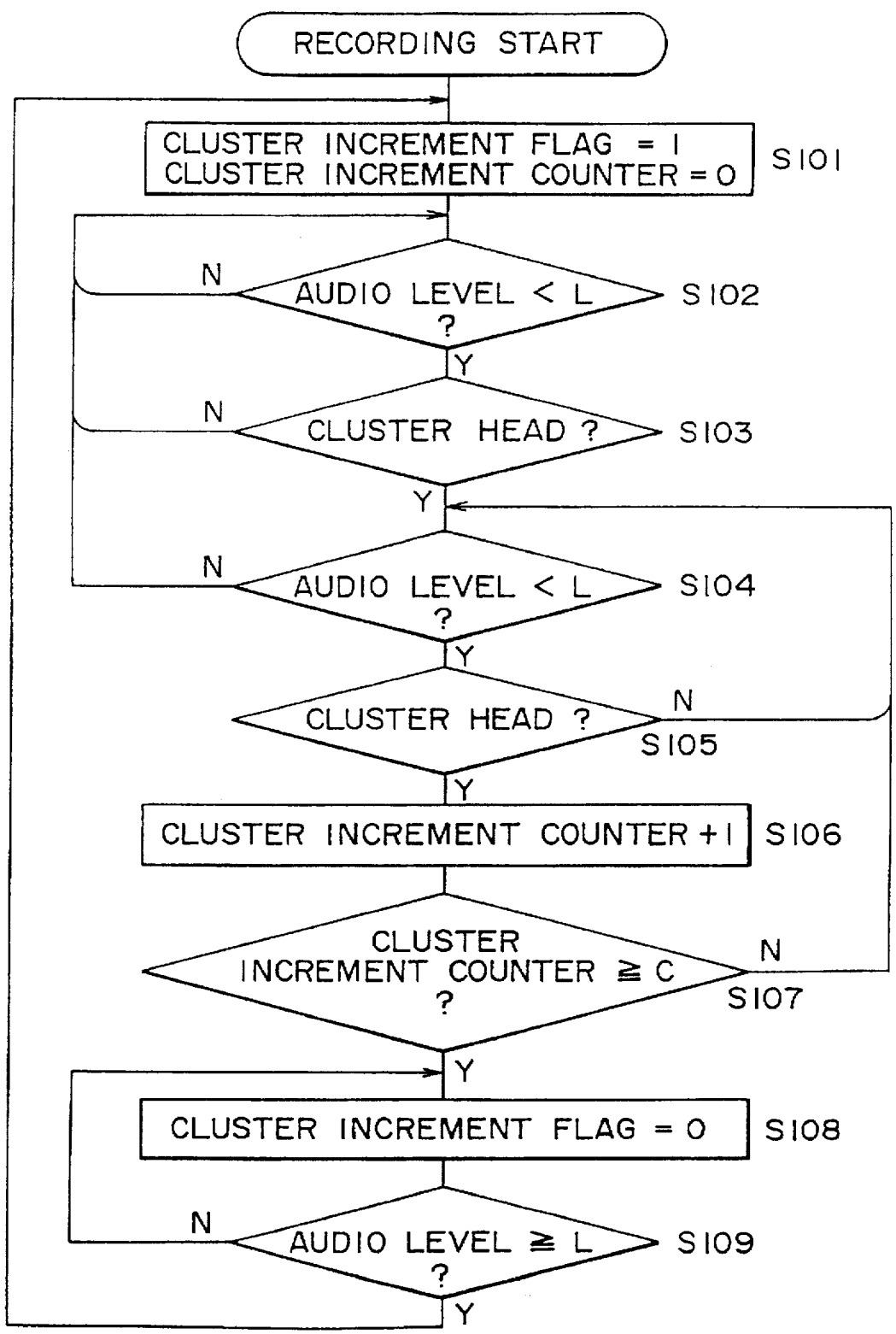
FIG. 12 is a flowchart of processing implemented by a first embodiment of the present invention.

The first embodiment shown in FIG. 12 is the processing carried out by the system controller 11 for implementing an operation like the one shown in FIG. 11.

After the recording operation has been started, the system controller 11 sets a cluster increment flag to a "1" and resets the contents of a cluster increment counter to a "0" at a step S101.

The cluster increment flag is a flag indicating whether or not the cluster number is to be incremented each time data for a cluster is recorded onto the disk. With the cluster increment flag set to a "1", data is recorded in cluster units continuously as the cluster $CL_1$, the cluster $CL_2$ and so on, incrementing the cluster number each time data of the amount of a cluster is recorded.

The cluster increment counter is, on the other hand, a counter for counting the number of successive clusters to be recorded with audio data in a so-called soundless state, that is, clusters for which the level of the audio data is lower than a predetermined value.

Since the cluster increment flag is set to a "1" at an ordinary recording time, each time data of the amount of a cluster is accumulated in the RAM unit 13, an operation to record data of one cluster onto the disk 1 is executed. The subsequent data of one cluster will be recorded into the next cluster, a cluster specified after incrementing the cluster number.

At a step S102, the system controller 11 monitors information supplied from the audio-level detecting unit 22 during a recording operation in order to determine whether or not the level of the input audio data is lower than a predetermined value L. If the level of the input audio data is found lower than the predetermined value L, the input audio data is determined to be in a soundless state.

In addition, if the level of the input audio data is found lower than the predetermined value L, the processing continues to a step S103 to find out whether or not the data is at the head of a cluster.

That is to say, "YES" outcomes are resulted in at both the steps S102 and S103 when a cluster starting with an audio level set in a soundless state is detected.

At a step S104 following the above steps, the level of the audio data is again compared to the predetermined value L to find out whether or not the former is lower than the latter.

If the level of the input audio data is found lower than the predetermined value L, the flow proceeds to a step S105 to find out whether or not the data is at the head of a cluster. "YES" outcomes are resulted in at both the steps S104 and S105 when a cluster having all data with an audio level set in a soundless state is detected. At that time, the flow proceeds to a step S106 to increment the contents of the cluster increment counter.

The flow then continues to a step S107 to find out whether or not the contents of the cluster increment counter are greater than a predetermined value C. If the contents of the cluster increment counter are found not greater than the predetermined value C, the flow returns to the step S104.

If the contents of the cluster increment counter are found greater than the predetermined value C at the step S107, on the other hand, the flow proceeds to a step S108 to reset the cluster increment flag to a "0". Accordingly, the number of the cluster, a recording location on the disk 1, is not incremented starting at this point. As a result, audio data of each succeeding cluster is written over an area of the same cluster on the disk repeatedly.

The flow then continues to a step S109. At the step S109, the system controller 11 monitors information supplied from the audio-level detecting unit 22 in this state. As the audio level exceeds the predetermined value L, that is, as the audio data enters a sounding state, the flow returns to the step S101 to set the cluster increment flag to a "1" and reset the contents of the cluster increment counter to a "0". By so doing, the ordinary processing operation is resumed.

Let us consider the processing described above by referring to FIG. 11. "YES" outcomes are resulted in at both the steps S102 and S103 when a cluster $CL_2$ starting with an audio level set in a soundless state is detected with timing which coincides with the head of a cluster $CL_3$. Let the predetermined value C used in the comparison at the step S107 be set at 2. In this case, at the step S108, the cluster increment flag is reset to a "0" with timing which coincides with the head of data of the amount of a cluster immediately following the cluster $CL_3$. As a result, data for clusters succeeding the cluster $CL_3$ is recorded on the same area of the cluster $CL_3$ on the disk repeatedly as shown in the figure.

At the step S101, the cluster increment flag is set to a "1" with timing which coincides with the detection of a sounding state at the step S109. As a result, the following data is recorded in areas on the disk starting with the cluster $CL_4$.

Such processing prevents the time gap between two consecutive programs from excessively increasing in length. When a playback operation is carried out by selecting CDs and programs from a CD changer, for example, a soundless state which results typically from the replacement of a disk by another, starting from the end point of a program and ending at the start point of a next program, may increase in length. None the less, the soundless state is not recorded on the optical magnetic disk 1 as it is. Instead, the gap between two consecutive programs is limited to a certain time of typically 2 to 4 seconds, allowing a well-shaped dubbing disk to be produced.

7. Processing Example as a Second Embodiment

Figure 13:
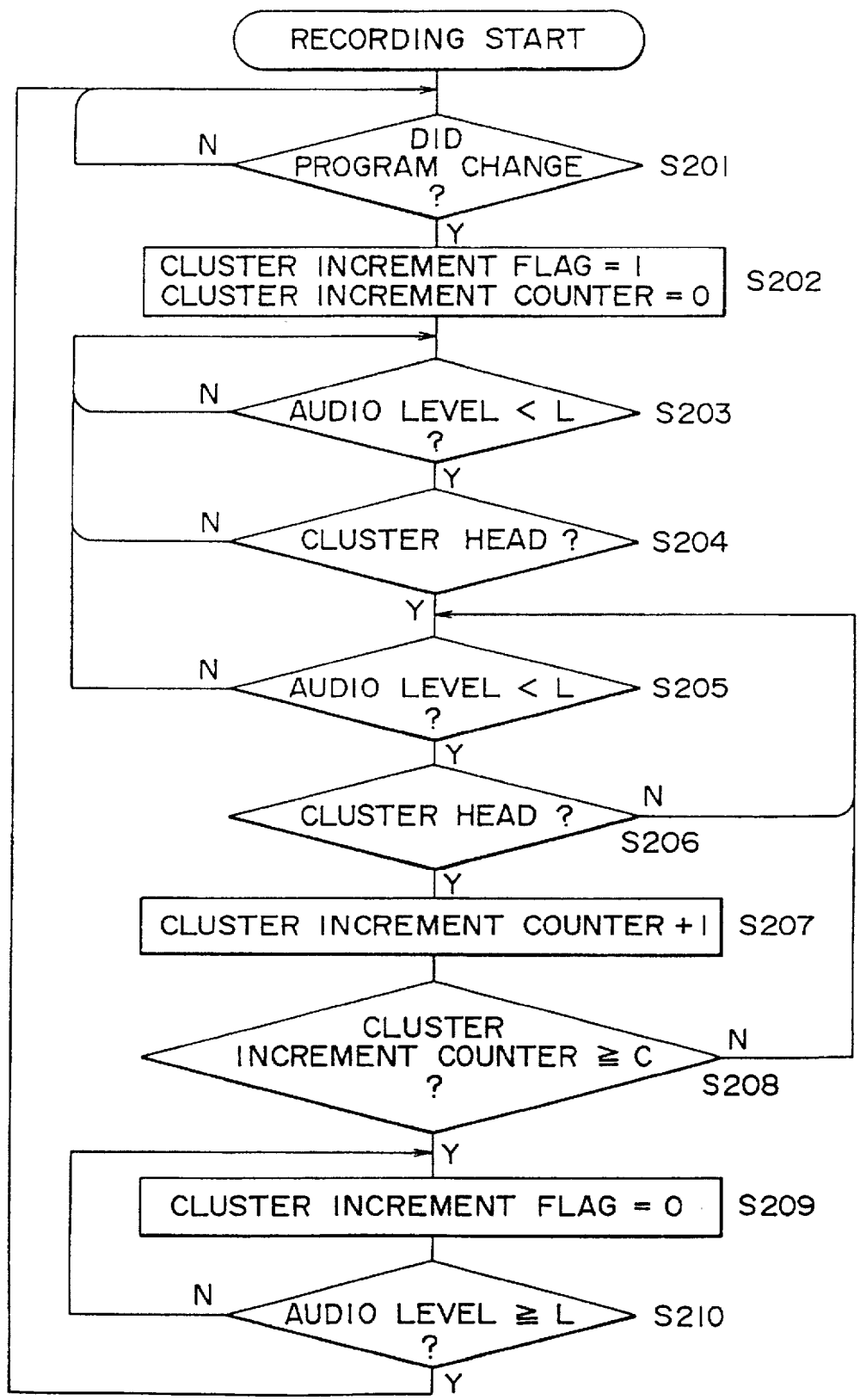
FIG. 13 is a flowchart of processing implemented by a second embodiment of the present invention.

Next, processing as implemented by a second embodiment will be described by referring to FIG. 13.

As described above, control data such as the U and C bits are supplied along with audio data. The system controller 11 can obtain information on the program number for the input data from U-bit data. Here, in this embodiment, a condition based on the information on the program number is added to the processing of a gap between two consecutive programs.

In the case of this processing example, at a step S201, the system controller 11 monitors a program number for the audio data from U-bit data which is extracted by the digital audio interface unit 21 during a recording operation. If the existence of a change in program number is verified, the flow proceeds to a step S202. It should be noted that since processings carried out at the step S202 to a step S210 are the same as those of the steps S101 to S109 shown in FIG. 12, their description is not repeated here.

A program received by the recording/playback apparatus may deliberately include a long soundless portion which can be detected by mistake as a long gap between two consecutive programs. In the case of this embodiment, however, the processing to keep the length of the soundless gap between two consecutive programs at a constant value or smaller is carried out only if the existence of a change in program number has been verified. As a result, the processing to keep the length of the soundless gap between two consecutive programs at a constant value or smaller is prevented for such a long soundless portion deliberately included as part of a program.

8. Processing Example as a Third Embodiment

Figure 14:
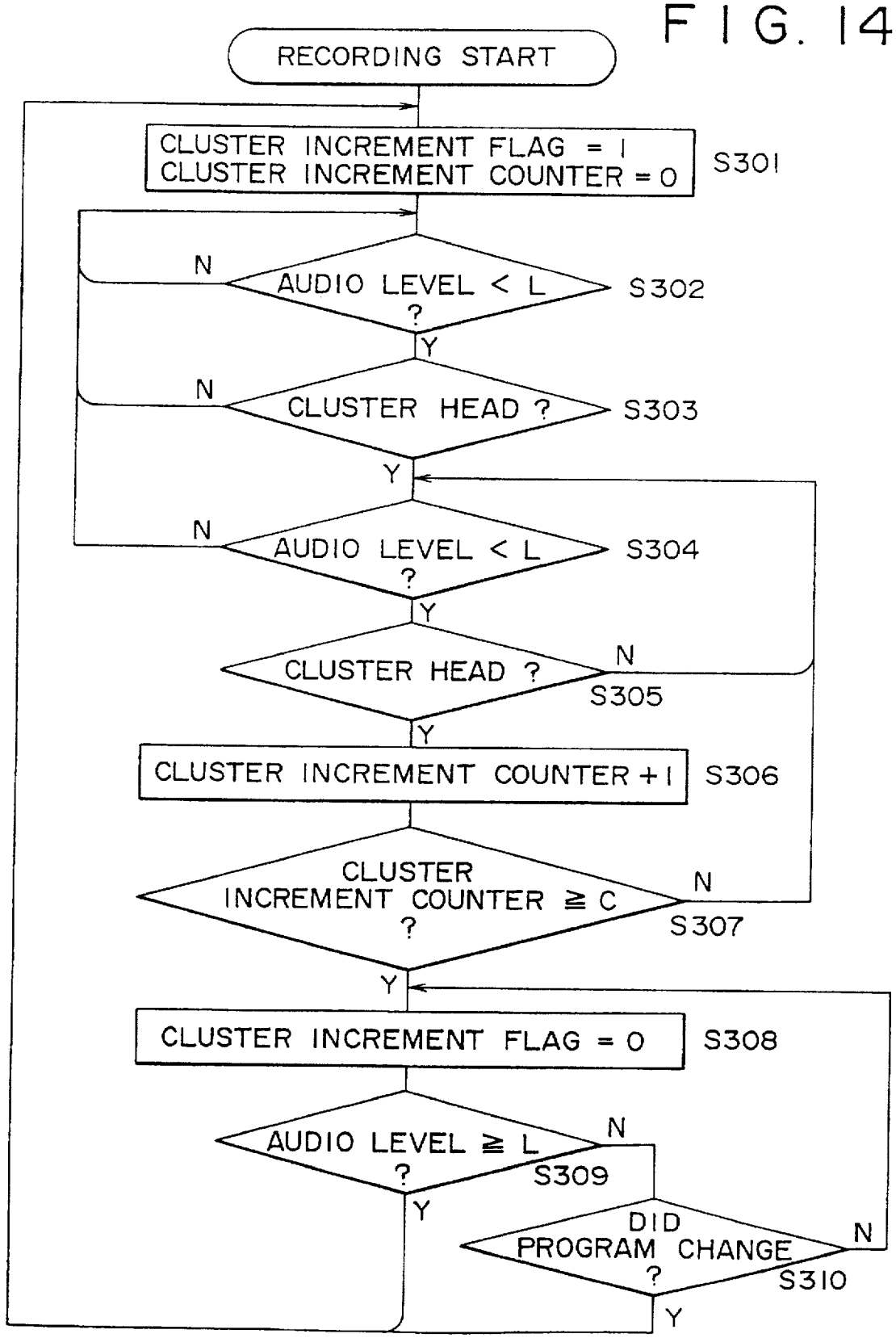
FIG. 14 is a flowchart of processing implemented by a third embodiment of the present invention.

Next, the processing as implemented by a third embodiment will be described by referring to FIG. 14.

Also in the case of this embodiment, the system controller 11 monitors information on the program number for the input data from U-bit data, and a condition based on the information on the program number is added to the processing of a gap between two consecutive programs.

In this example, since processings carried out at steps S301 to S309 are the same as those of the steps S101 to S109 shown in FIG. 12, their description is not repeated here.

It should be noted, however, that after the cluster increment flag has been reset to a "0" at the step S308, the level of the audio data is compared to the predetermined value L at the step S309 to determine whether or not the former is greater than the latter. If the level of the audio data is found smaller than the predetermined value L, the flow continues to a step S310 to monitor a change in program number for the audio data.

If the level of the audio data is found equal to or greater than the predetermined value L at the step S309 or the existence of a change in program number for the audio data is verified at the step S310, the flow returns to the step S301, resuming the normal recording operation.

A program supplied to the recording/playback apparatus may deliberately include a soundless portion at the head thereof which portion may be detected by mistake as a gap between two consecutive programs as it used to be. In the case of this embodiment, however, the processing to keep the length of the soundless gap between two consecutive programs at a constant value or smaller is prevented for such a soundless portion. In other words, a soundless portion required at the head of a program is recorded as it is, preventing the soundless portion from being packed into a fixed length.

9. Processing Example as a Fourth Embodiment

Next, the processing as implemented by a fourth embodiment will be described by referring to FIG. 15.

Figure 15:
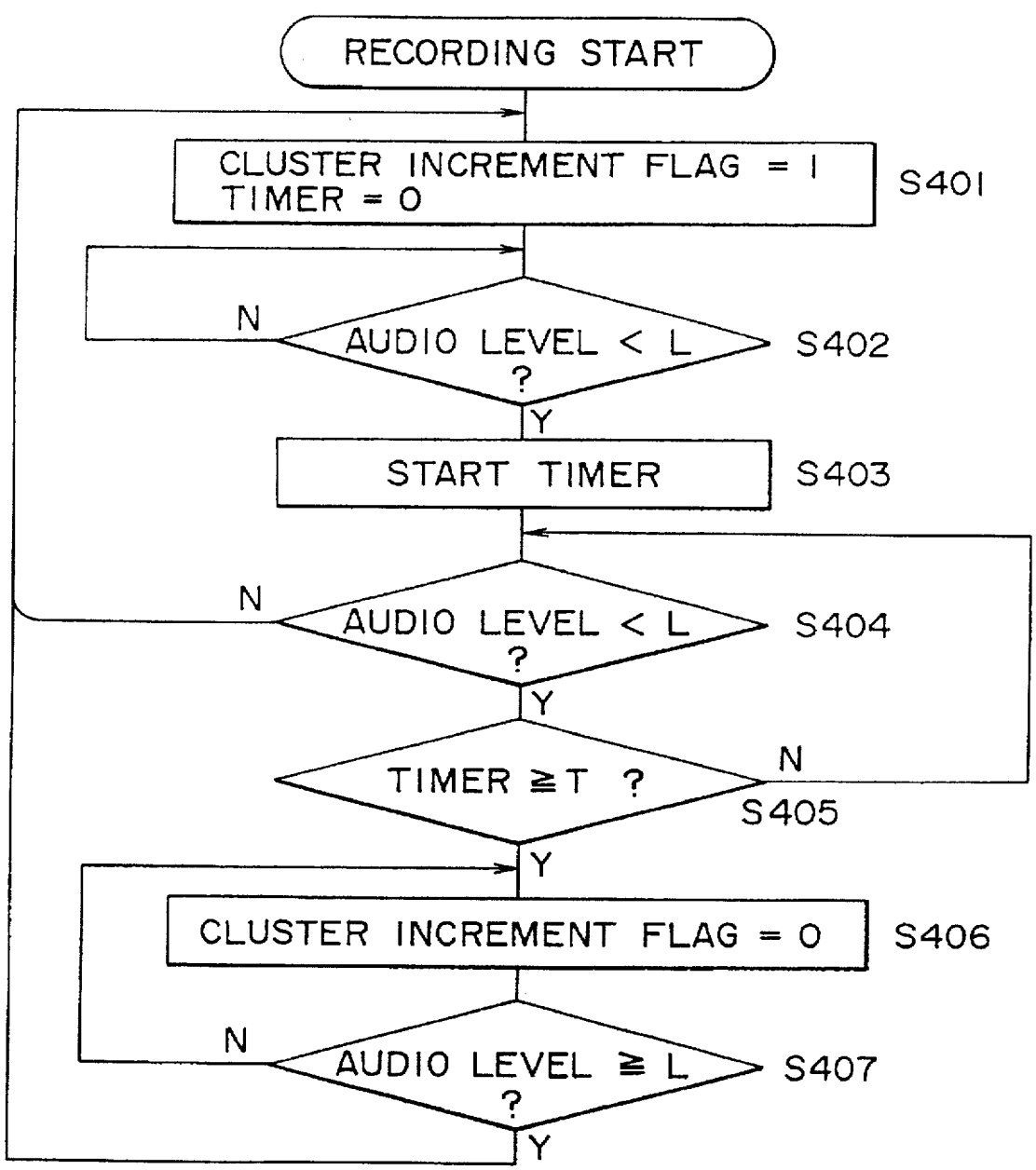
FIG. 15 is a flowchart of processing implemented by a fourth embodiment of the present invention.

FIG. 15 shows a fourth embodiment implementing the processing carried out by the system controller 11 for realizing an operation to handle a gap between two consecutive programs of data to be recorded like the one shown in FIG. 11.

Much like the first embodiment described earlier, after the recording operation has been started, at a step S401, the system controller 11 first of all sets the cluster increment flag to a "1" and resets the contents of a timer employed in the system controller 11 to a "0".

At a point of time the cluster increment flag is set to a "1", the recording of data of the amount of 1 cluster onto the optical magnetic disk 1 is executed each time data of the amount of 1 cluster is accumulated. The following data of the amount of 1 cluster is recorded into the next cluster on the optical magnetic disk 1.

At a step S402, the system controller 11 utilizes information received from the audio-level detecting unit 22 to determine whether or not the level of the supplied audio data is lower than the predetermined value L. If the level of the supplied audio data is found lower than the predetermined value L, the audio data is determined to be in a soundless state.

If the level of the supplied audio data is found lower than the predetermined value L, the flow proceeds to a step S403 where the system controller 11 activates the timer.

After the timer is started, the flow proceeds to a step S404 to determine whether or not the level of the supplied audio data is lower than the predetermined value L. If the level of the supplied audio data is found lower than the predetermined value L, the flow proceeds to a step S405 to determine whether or not the contents of the timer are greater than a predetermined value T. If the contents of the timer are found not greater than the predetermined value T, the flow returns to the step S404.

If the contents of the timer are found equal to or greater than the predetermined value T at the step S405, on the other hand, the flow proceeds to a step S406 to reset the cluster increment flag to a "0". Accordingly, from this point of time, the cluster number indicating a recording location on the optical magnetic disk 1 is not incremented. As a result, the audio data for the succeeding clusters is written over an area of the same cluster on the disk repeatedly.

The flow then continues to a step S407. At the step S407, the system controller 11 monitors information supplied from the audio-level detecting unit 22 in this state. As the audio level exceeds the predetermined value L, that is, as the audio data enters a sounding state, the flow returns to the step S401 to set the cluster increment flag to a "1" and reset the contents of the cluster increment counter to a "0". By so doing, the ordinary processing operation is resumed.

Let us consider the processing described above by referring to FIG. 11. A soundless state is detected in the course of the cluster $CL_1$, activating the timer. While the soundless state is continuing as it is, let the contents of the timer exceed the predetermined value T with timing which coincides with the head of a cluster $CL_3$ or in the course of the cluster $CL_3$. In this case, the cluster increment flag is reset to a "0" at the step S406 with the same timing described above. As a result, data for clusters succeeding the cluster $CL_3$ is recorded on the same area of the cluster $CL_3$ on the disk repeatedly as shown in the figure.

At the step S101, the cluster increment flag is set to a "1" with timing which coincides with the detection of a sounding state at the step S407. As a result, the following data is recorded in areas on the disk starting with the cluster $CL_4$.

Such processing prevents the time gap between two consecutive programs from excessively increasing in length. When a playback operation is carried out by selecting CDs and programs from a CD changer, for example, a soundless state which results typically from the replacement of a disk by another, starting from the end point of a program and ending at the start point of a next program, may increase in length. None the less, the soundless state is not recorded on the optical magnetic disk 1 as it is. Instead, the gap between two consecutive programs is limited to a certain time of typically 2 to 4 seconds, allowing a well-shaped dubbing disk to be produced.

10. Processing Example as a Fifth Embodiment

Figure 16:
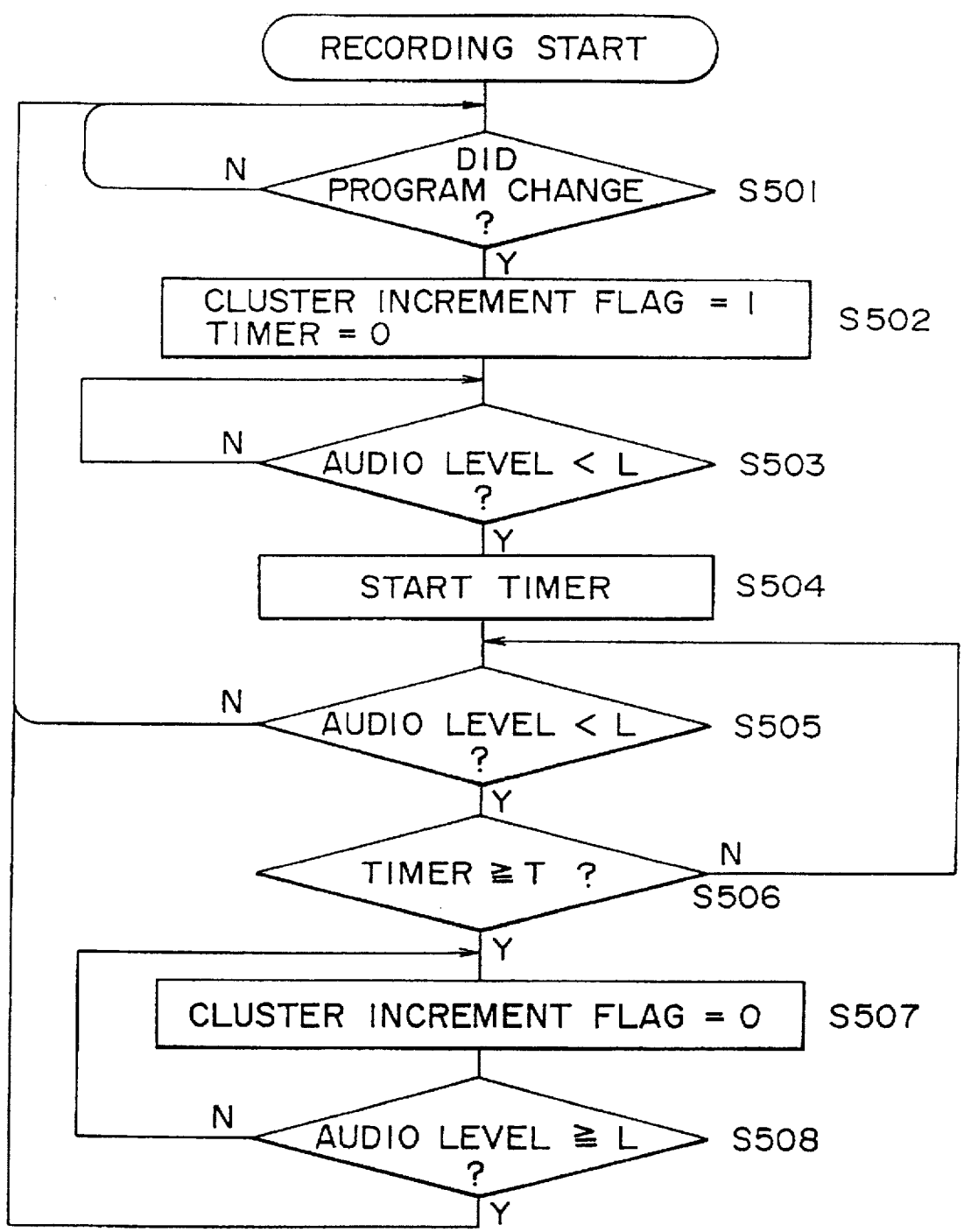
FIG. 16 is a flowchart of processing implemented by a fifth embodiment of the present invention.

Next, the processing as implemented by a fifth embodiment will be described by referring to FIG. 16.

In the case of this embodiment, in addition to the processing implemented as the fourth embodiment described above, the system controller 11 obtains information on the program number for the input data from U-bit data, and a condition based on the information on the program number is added to the processing of a gap between two consecutive programs.

In the case of this processing example, at a step S501, the system controller 11 monitors a program number for the audio data from U-bit data which is extracted by the digital audio interface unit 21 during a recording operation. If the existence of a change in program number is verified, the flow proceeds to a step S502. It should be noted that since processings carried out at the step S502 to a step S508 are the same as those of the steps S401 to S407 shown in FIG. 15, their description is not repeated here.

A program received by the recording/playback apparatus may deliberately include a long soundless portion which can be detected by mistake as a long gap between two consecutive programs. In the case of this embodiment, however, the processing to keep the length of the soundless gap between two consecutive programs at a constant value or smaller is carried out only if the existence of a change in program number has been verified. As a result, the processing to keep the length of the soundless gap between two consecutive programs at a constant value or smaller is prevented for such a long soundless portion deliberately included as part of a program.

11. Processing Example as a Sixth Embodiment

Figure 17:
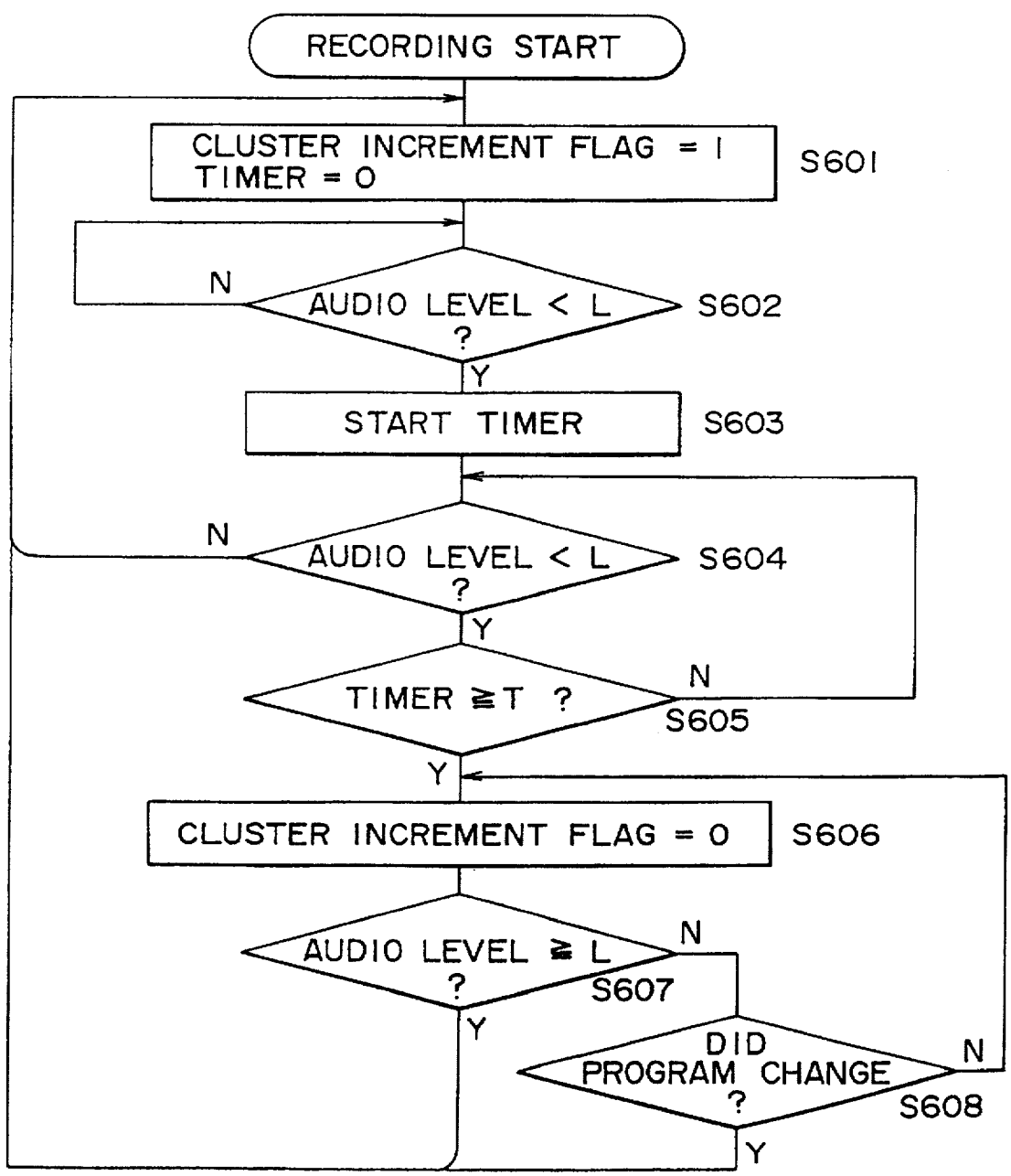
FIG. 17 is a flowchart of processing implemented by a sixth embodiment of the present invention.

Next, the processing as implemented by a sixth embodiment will be described by referring to FIG. 17.

Also in the case of this embodiment, the system controller 11 monitors information on the program number for the input data from U-bit data, and a condition based on the information on the program number is added to the processing of a gap between two consecutive programs.

In this example, since processings carried out at steps S601 to S607 are the same as those of the steps S401 to S409 shown in FIG. 15, their description is not repeated here.

It should be noted, however, that after the cluster increment flag has been reset to a "0" at the step S606, the level of the audio data is compared to the predetermined value L at the step S607 to determine whether or not the former is greater than the latter. If the level of the audio data is found smaller than the predetermined value L, the flow continues to a step S608 to monitor a change in program number for the audio data.

If the level of the audio data is found equal to or greater than the predetermined value L at the step S607 or the existence of a change in program number for the audio data is verified at the step S608, the flow returns to the step S601, resuming the normal recording operation.

A program supplied to the recording/playback apparatus may deliberately include a soundless portion at the head thereof which portion may be detected by mistake as a gap between two consecutive programs as it used to be. In the case of this embodiment, however, the processing to keep the length of the soundless gap between two consecutive programs at a constant value or smaller is prevented for such a soundless portion. In other words, a soundless portion required at the head of a program is recorded as it is, preventing the soundless portion from being packed into a fixed length.

In the embodiments described above, data received through a digital audio interface is recorded. It should be noted, however, that the processings implemented by the embodiments can be applied to the recording of an audio signal which is received as an analog signal. In this case, a detector for detecting the level of the audio signal received as an analog signal is required.

In addition, the verification of a change in program number can be implemented by providing a connection means that, at least, allows control data to be transmitted even if the audio signal is an analog signal.

The embodiments have been described using the recording/playback apparatus; however, they can also be applied to a recording apparatus as well. On the top of that, the application of the embodiments is not limited to a recording apparatus for optical magnetic disks. Instead, the scope of the present invention covers recording apparatuses for a variety of rewritable optical disks and a variety of tape media such as magnetic tapes.

What is claimed is:

1. A recording apparatus for dividing an audio signal supplied thereto into predetermined blocks and recording said audio signal onto a recording medium in predetermined block units, comprising:

a level detecting means for detecting the level of said audio signal;

a comparison means for comparing a level detected by said level detecting means to a predetermined level;

a block counting means for counting the number of blocks in said audio signal when said comparison means determines that the level of said audio signal is lower than said predetermined level;

a judging means for determining whether or not the number of blocks in said audio signal to be recorded onto said recording medium with a level lower than said predetermined level is greater than a predetermined value on the basis of contents of said block counting means; and a recording control means for controlling a recording means in such a way that, when said judging means determines that the number of blocks in said audio signal to be recorded onto said recording medium with a level lower than said predetermined level is greater than said predetermined value, said audio signal with a level lower than said predetermined level is written over an already recorded location on said recording medium till the level of said audio signal supplied to said level detecting means becomes higher than said predetermined level.

2. A recording apparatus according to claim 1, further comprising:

a program-change detecting means for detecting a change in program of said audio signal supplied thereto;

wherein after said program-change detecting means determines that a program in said audio signal supplied thereto changes, said judging means determines whether or not the number of blocks in said audio signal with a level lower than said predetermined level is greater than said predetermined value, and said recording control means controls said recording means in such a way that, when said judging means determines that the number of blocks in said audio signal to be recorded onto said recording medium with a level lower than said predetermined level is greater than said predetermined value, said audio signal with a level lower than said predetermined level is written over an already recorded location on said recording medium till the level of said audio signal supplied to said level detecting means becomes higher than said predetermined level.

3. A recording apparatus according to claim 1, further comprising:

a program-change detecting means for detecting a change in program of said audio signal supplied thereto;

wherein said judging means determines whether or not the number of blocks in said audio signal with a level lower than said predetermined level is greater than said predetermined value, and said recording control means controls said recording means in such a way that, when said judging means determines that the number of blocks in said audio signal to be recorded onto said recording medium with a level lower than said predetermined value, said audio signal with a level lower than said predetermined level is written over an already recorded location on said recording medium till the level of said audio signal supplied to said level detecting means becomes higher than said predetermined level or till said program-change detecting means detects a change in program of said audio signal.

4. A recording apparatus according to claim 2, wherein a change in program of said audio signal supplied thereto is detected by detecting a change in program number recorded in said recording medium in advance.

5. A recording apparatus according to claim 3, wherein a change in program of said audio signal supplied thereto is detected by detecting a change in program number recorded in said recording medium in advance.

6. A recording apparatus for dividing an audio signal supplied thereto into predetermined blocks and recording said audio signal onto a recording medium in predetermined block units, comprising:

a level detecting means for detecting the level of said audio signal;

a comparison means for comparing a level detected by said level detecting means to a predetermined level;

a time counting means for measuring the lapse of time since detection of a level of said audio signal lower than said predetermined level as said comparison means determines that the level of said audio signal is lower than said predetermined level;

a judging means for determining whether or not said audio signal to be recorded onto said recording medium with a level lower than said predetermined level continues for a period longer than a predetermined time on the basis of contents of said time counting means; and a recording control means for controlling a recording means in such a way that, when said judging means determines that said audio signal to be recorded onto said recording medium with a level lower than said predetermined level continues for a period longer than said predetermined time, said audio signal with a level lower than said predetermined level is written over an already recorded location on said recording medium till the level of said audio signal supplied to said level detecting means becomes higher than said predetermined level.

7. A recording apparatus according to claim 6, further comprising:

a program-change detecting means for detecting a change in program of said audio signal supplied thereto;

wherein after said program-change detecting means determines that a program in said audio signal supplied thereto changes, said judging means determines whether or not said audio signal to be recorded onto said recording medium with a level lower than said predetermined level continues for a period longer than said predetermined time, and said recording control means controls said recording means in such a way that, when said judging means determines that said audio signal to be recorded onto said recording medium with a level lower than said predetermined level continues for a period longer than said predetermined time, said audio signal with a level lower than said predetermined level is written over an already recorded location on said recording medium till the level of said audio signal supplied to said level detecting means becomes higher than said predetermined level.

8. A recording apparatus according to claim 6, further comprising:

a program-change detecting means for detecting a change in program of said audio signal supplied thereto;

said judging means determines whether or not said audio signal to be recorded onto said recording medium with a level lower than said predetermined level continues for a period longer than said predetermined time, and said recording control means controls said recording means in such a way that, when said judging means determines that said audio signal to be recorded onto said recording medium with a level lower than said predetermined level continues for a period longer than said predetermined time, said audio signal with a level lower than said predetermined level is written over an already recorded location on said recording medium till the level of said audio signal supplied to said level detecting means becomes higher than said predetermined level or till said program-change detecting means detects a change in program of said audio signal.

9. A recording apparatus according to claim 7, wherein a change in program of said audio signal supplied thereto is detected by detecting a change in program number recorded in said recording medium in advance.

10. A recording apparatus according to claim 8, wherein a change in program of said audio signal supplied thereto is detected by detecting a change in program number recorded in said recording medium in advance.

11. A recording apparatus for dividing an audio signal supplied thereto into predetermined blocks and recording said audio signal onto a recording medium in predetermined block units, comprising:

a level detector for detecting the level of said audio signal;

a comparator for comparing a level detected by said level detector to a predetermined level;

a block counter for counting the number of blocks in said audio signal when said comparator determines that the level of said audio signal is lower than said predetermined level;

a discriminator for determining whether or not the number of blocks in said audio signal to be recorded onto said recording medium with a level lower than said predetermined level is greater than a predetermined value on the basis of contents of said block counter; and a controller for controlling a recording head in such a way that, when said discriminator determines that the number of blocks in said audio signal to be recorded onto said recording medium with a level lower than said predetermined level is greater than said predetermined value, said audio signal with a level lower than said predetermined level is written over an already recorded location on said recording medium till the level of said audio signal supplied to said level detector becomes higher than said predetermined level.

12. A recording apparatus for dividing an audio signal supplied thereto into predetermined blocks and recording said audio signal onto a recording medium in predetermined block units, comprising:

a level detector for detecting the level of said audio signal;

a comparator for comparing a level detected by said level detector to a predetermined level;

a time counter for measuring the lapse of time since detection of a level of said audio signal lower than said predetermined level as said comparator determines that the level of said audio signal is lower than said predetermined level;

a discriminator for determining whether or not said audio signal to be recorded onto said recording medium with a level lower than said predetermined level continues for a period longer than a predetermined time on the basis of contents of said time counter; and a controller for controlling a recording head in such a way that, when said discriminator determines that said audio signal to be recorded onto said recording medium with a level lower than said predetermined level continues for a period longer than said predetermined time, said audio signal with a level lower than said predetermined level is written over an already recorded location on said recording medium till the level of said audio signal supplied to said level detector becomes higher than said predetermined level.

13. A recording method for making a segment on a recording medium for recording a soundless portion of a supplied audio signal fixed in length when dividing said audio signal into predetermined block units and recording said audio signal onto said recording medium in predetermined block units, comprising the steps of:

detecting the level of said audio signal;

comparing the detected level of said audio signal to a predetermined level;

counting the number of blocks in said audio signal when said detected level of said audio signal is lower than said predetermined level;

determining whether or not the number of blocks counted in said audio signal with a level lower than said predetermined level is greater than a predetermined value; and controlling a recording head in such a way that, when the number of blocks in said audio signal with a level lower than said predetermined level is greater than said predetermined value, said audio signal with a level lower than said predetermined level is written over any already recorded location on said recording medium until the level of the supplied audio signal becomes higher than said predetermined level.

* * * * *